(12) United States Patent
Nagai et al.

(10) Patent No.: US 12,367,594 B2
(45) Date of Patent: Jul. 22, 2025

(54) EVALUATION SYSTEM, EVALUATION METHOD, AND PROGRAM

(71) Applicant: TOYOTA JIDOSHA KABUSHIKI KAISHA, Toyota (JP)

(72) Inventors: Manabu Nagai, Nagoya (JP); Suguru Watanabe, Nagoya (JP); Yusuke Nakano, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 407 days.

(21) Appl. No.: 18/070,653

(22) Filed: Nov. 29, 2022

(65) Prior Publication Data
US 2023/0177700 A1    Jun. 8, 2023

(30) Foreign Application Priority Data
Dec. 8, 2021 (JP) .................... 2021-199462

(51) Int. Cl.
*G06T 7/20* (2017.01)
*G06T 7/70* (2017.01)

(52) U.S. Cl.
CPC ............. *G06T 7/20* (2013.01); *G06T 7/70* (2017.01); *G06T 2207/10016* (2013.01); *G06T 2207/30196* (2013.01)

(58) Field of Classification Search
CPC ... G06T 7/20; G06T 7/70; G06T 2207/10016; G06T 2207/30196; G06T 7/248; G06V 20/52; G06N 5/041
See application file for complete search history.

(56) References Cited

U.S. PATENT DOCUMENTS

| 11,087,176 B2* | 8/2021 | Ebstyne | G06V 10/774 |
| 2010/0207762 A1* | 8/2010 | Lee | G06V 20/52 |
| | | | 340/541 |
| 2020/0226467 A1* | 7/2020 | Fainekos | G06T 7/77 |

FOREIGN PATENT DOCUMENTS

| JP | 2012-518846 A | 8/2012 |
| WO | 2010/141117 A2 | 12/2010 |

OTHER PUBLICATIONS

Anton et al, ("Challenges of Ground Truth Evaluation of Multi-Target Tracking", 2013 IEEE Conference on Computer Vision and Pattern Recognition Workshops, pp. 735-742) (Year: 2013).*

(Continued)

*Primary Examiner* — Amara Abdi
(74) *Attorney, Agent, or Firm* — Dinsmore & Shohl LLP

(57) ABSTRACT

An estimation result determination unit determines, for each of the objects, a correct estimation result or one of a plurality of false estimation types, which indicate types of false estimation results using ground truth data that corresponds to a video image and output data indicating the result of the estimation made on the video image by the algorithm. The evaluation value calculation unit adds false estimation coefficients that correspond to the plurality of respective false estimation types and are provided so as to become higher in accordance with a degree of impact of the false estimation type for a number of objects that correspond to the false estimation type and thus calculates an evaluation value of the algorithm based on the total value of the added values of the false estimation coefficients obtained for each of the plurality of false estimation types.

9 Claims, 8 Drawing Sheets

(56) References Cited

OTHER PUBLICATIONS

Taalimi et al, (Robust multi-object tracking using confident detections and safe tracklets, IEEE 2015, pp. 1638-1642) (Year: 2015).*

Milan, et al., "Challenges of Ground Truth Evaluation of Multi-Target Tracking", 2013 IEEE Conference on Computer Vision and Pattern Recognition Workshops, p. 735-742, DOI: 10.1109/CVPRW.2013.111.

Kodaria, "Near-miss Accident Risk Estimation on Drive Recorder Data", DEIM Forum 2019, 11th Forum on Data Engineering and Information Management (17th Annual Conference of the Database Society of Japan), [online], Japan issued on Mar. 6, 2019.

Luiten et. al, "HOTA: A Higher Order Metric for Evaluating Multi-Object Tracking", International Journal of Computer Vision (2021), Oct. 8, 2020, 129, p. 548-578.

* cited by examiner

| FALSE ESTIMATION TYPE | | DEGREE OF IMPACT | FALSE ESTIMATION COEFFICIENT |
|---|---|---|---|
| FP | FALSE DETECTION | SMALL | $\alpha$ |
| FN | OVERLOOKING | LARGE | $\beta$ |
| IDSWn | NEW FALSE DETECTION | RATHER SMALL | $\gamma$ |
| IDSWc | SWITCHING | RATHER LARGE | $\delta$ |

| TP | TRUE ESTIMATION |
|---|---|

Fig. 2

EVALUATION SYSTEM, EVALUATION METHOD, AND PROGRAM

CROSS REFERENCE TO RELATED APPLICATIONS

This application is based upon and claims the benefit of priority from Japanese patent application No. 2021-199462, filed on Dec. 8, 2021, the disclosure of which is incorporated herein in its entirety by reference.

BACKGROUND

The present disclosure relates to an evaluation system, an evaluation method, and a program.

There are techniques for tracking a movable object using video data. With regard to this technique, Published Japanese Translation of PCT International Publication for Patent Application, No. 2012-518846 discloses a system and a method for predictive abnormal behavior detection. The system disclosed in Published Japanese Translation of PCT International Publication for Patent Application, No. 2012-518846 receives surveillance data such as video data, creates a plurality of prediction models, and updates the prediction models. The system further receives video data relating to a moving object and generates prediction of future locations of the moving object based on the generated prediction models. The predicted motion is scored by a scoring engine to determine if the predicted motion is unsafe or otherwise undesirable. Further, Luiten2021 (Jonathon Luiten et. al, "HOTA: A Higher Order Metric for Evaluating Multi-Object Tracking", International Journal of Computer Vision (2021) 129:548-578, https://doi.org/10.1007/s11263-020-01375-2) discloses a method for evaluating a tracking system.

SUMMARY

When, for example, a tracking system is used in a specific usage environment such as traffic control, it is required to evaluate whether this tracking system performs well under this usage environment. However, Published Japanese Translation of PCT International Publication for Patent Application, No. 2012-518846 does not disclose a method for evaluating a tracking system. Further, according to the technique disclosed in Luiten2021, an evaluation method such as Multi-Object Tracking Accuracy (MOTA) is disclosed. However, depending on the environment where the tracking system is used, large values (evaluation values) of an evaluation expression listed in Luiten2021 do not necessarily mean that the tracking system is performing well. Therefore, it is desired to appropriately evaluate the quality of an algorithm (tracking system) that estimates the position of a movable object and tracks the object.

The present disclosure provides an evaluation system, an evaluation method, and a program capable of appropriately evaluating the quality of an algorithm that estimates the position of a movable object and tracks the object.

An evaluation system according to the present disclosure is an evaluation system configured to evaluate the quality of an algorithm that estimates the positions of movable objects in a video image and tracks the objects, an estimation result determination unit configured to determine, for each of the objects, a correct estimation result or one of a plurality of false estimation types, which indicate types of false estimation results using ground truth data that corresponds to the video image and output data indicating the result of the estimation made on the video image by the algorithm; and an evaluation value calculation unit configured to add false estimation coefficients that correspond to the plurality of respective false estimation types and are provided so as to become higher in accordance with a degree of impact of the false estimation type for a number of objects that correspond to the false estimation type and thus calculate an evaluation value of the algorithm based on the total value of the added values of the false estimation coefficients obtained for each of the plurality of false estimation types.

Further, an evaluation method according to the present disclosure is an evaluation method for evaluating the quality of an algorithm that estimates the positions of movable objects in a video image and tracks the objects, the evaluation method including: determining, for each of the objects, a correct estimation result or one of a plurality of false estimation types, which indicate types of false estimation results, using ground truth data that corresponds to the video image and output data indicating the result of the estimation made on the video image by the algorithm; and adding false estimation coefficients that correspond to the plurality of respective false estimation types and are provided so as to become higher in accordance with a degree of impact of the false estimation type for a number of objects that correspond to the false estimation type and thus calculating an evaluation value of the algorithm based on the total value of the added values of the false estimation coefficients obtained for each of the plurality of false estimation types.

Further, a program according to the present disclosure is a program for implementing an evaluation method for evaluating the quality of an algorithm that estimates the positions of movable objects in a video image and tracks the objects, the program causing a computer to execute the processing of: determining, for each of the objects, a correct estimation result or one of a plurality of false estimation types, which indicate types of false estimation results, using ground truth data that corresponds to the video image and output data indicating the result of the estimation made on the video image by the algorithm; and adding false estimation coefficients that correspond to the plurality of respective false estimation types and are provided so as to become higher in accordance with a degree of impact of the false estimation type for a number of objects that correspond to the false estimation type and thus calculating an evaluation value of the algorithm based on the total value of the added values of the false estimation coefficients obtained for each of the plurality of false estimation types.

In the present disclosure, the false estimation coefficient is set to be higher as the degree of impact of the corresponding false estimation type becomes larger. Therefore, as false estimation with a large degree of impact is made more frequently, the evaluation may become lower. It can be said that the quality of an algorithm that performs false estimation with a large degree of impact frequently is low. Therefore, according to the present disclosure, it becomes possible to appropriately evaluate the quality of an algorithm.

Further, the false estimation coefficient that corresponds to a first false estimation, which is one of the plurality of false estimation types and is a false estimation type regarding a situation in which the algorithm has failed to estimate the object included in the ground truth data, may be set to be higher than the false estimation coefficients that correspond to the other false estimation types.

Since the present disclosure is thus configured, it becomes possible to evaluate the quality of an algorithm more appropriately.

Further, the false estimation coefficient that corresponds to a second false estimation, which is one of the plurality of false estimation types and is a false estimation type regarding a situation in which the algorithm estimates the plurality of objects included in the ground truth data between one timing and the next timing in a switched manner, is set to be higher than the false estimation coefficient that corresponds to a third false estimation, which is a false estimation type regarding a situation in which the algorithm estimates that one of the objects included in the ground truth data at one timing is different from the object included in the ground truth data at the next timing.

Since the present disclosure is thus configured, it becomes possible to evaluate the quality of an algorithm more appropriately.

Further, the evaluation system may further include a coefficient calculation unit configured to calculate the false estimation coefficient for each timing of estimation.

Since the present disclosure is thus configured, it is possible to change the false estimation coefficient in accordance with the change in the situation. Therefore, it is possible to evaluate the quality of the estimation algorithm more appropriately.

Further, the coefficient calculation unit may calculate, when a false estimation of the same type has been continuously made for one object, the false estimation coefficient in such a way that the false estimation coefficient that corresponds to this false estimation type regarding this object is made higher.

Since the present disclosure is thus configured, it is possible to evaluate the quality of the estimation algorithm more appropriately.

Further, the coefficient calculation unit may calculate, when a first false estimation, which is a false estimation type regarding a situation in which the algorithm has failed to estimate the object included in the ground truth data, has been continuously made, the false estimation coefficient in such a way that the false estimation coefficient that corresponds to the first false estimation is made higher.

Since the present disclosure is thus configured, it is possible to evaluate the quality of the estimation algorithm more appropriately.

Further, the coefficient calculation unit may calculate the false estimation coefficient in such a way that the false estimation coefficient that corresponds to a false estimation type regarding the object becomes higher as the speed of this object increases.

Since the present disclosure is thus configured, it is possible to evaluate the quality of the estimation algorithm more appropriately.

Further, the coefficient calculation unit may calculate the false estimation coefficient in such a way that the false estimation coefficient that corresponds to a false estimation type regarding an object becomes lower as the number of other objects whose type is the same as that of the object and whose distances from this object are equal to or smaller than a predetermined threshold becomes larger.

Since the present disclosure is thus configured, it is possible to evaluate the quality of the estimation algorithm more appropriately.

According to the present disclosure, it is possible to provide an evaluation system, an evaluation method, and a program capable of appropriately evaluating the quality of an algorithm that estimates the position of a movable object and tracks the object.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 2 is a diagram for describing false estimation types according to this embodiment;

DESCRIPTION OF EMBODIMENTS

First Embodiment

Hereinafter, with reference to the drawings, embodiments of the present disclosure will be described. For the sake of clarification of the description, the following descriptions and the drawings are omitted and simplified as appropriate. Further, throughout the drawings, the same elements are denoted by the same reference symbols and overlapping descriptions are omitted as necessary.

Figure 1:
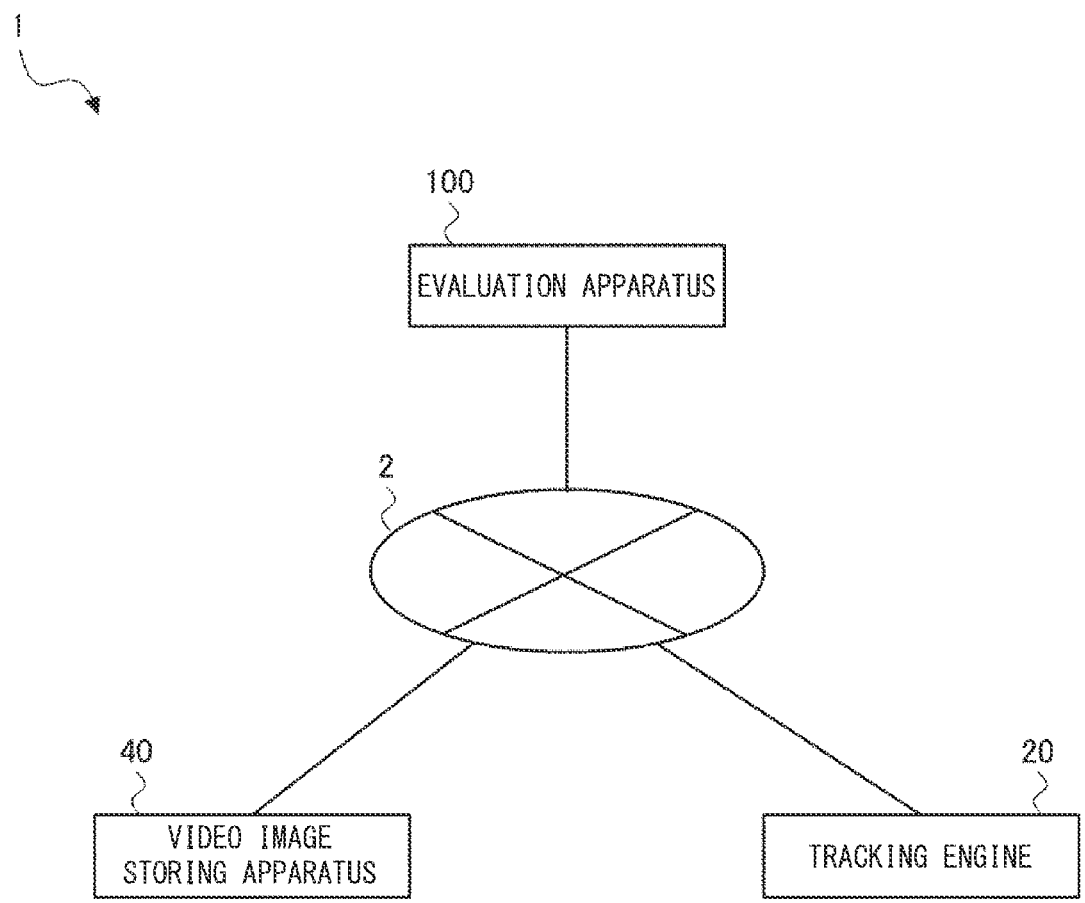
FIG. 1 is a diagram showing an evaluation system according to a first embodiment.

FIG. 1 is a diagram showing an evaluation system 1 according to a first embodiment. The evaluation system 1 includes a tracking engine 20, a video image storing apparatus 40, and an evaluation apparatus 100. The tracking engine 20, the video image storing apparatus 40, and the evaluation apparatus 100 may be connected to one another in such a way that they can communicate with one another via a wired or wireless network 2.

The tracking engine 20 is, for example, a computer. The tracking engine 20 operates an estimation algorithm that estimates the position of a movable object (a moving object) and tracks the moving object. That is, the estimation algorithm detects an object from a video image. The tracking engine 20 inputs a video image stored in the video image storing apparatus 40 that will be described later into the estimation algorithm and causes the estimation algorithm to operate. The estimation algorithm performs estimation of the position and the type of the object for each of the image frames on the input video image and then outputs the result of the estimation. The tracking engine 20 transmits the result of estimating the object output from the estimation algorithm to the evaluation apparatus 100 as output data. Note that the estimation algorithm does not need to perform the estimation processing for each of the image frames. For example, the estimation algorithm may perform the estimation processing on even-numbered image frames.

Note that the tracking engine 20 may transmit the output data (the result of the estimation) for each of the image frames. Alternatively, the tracking engine 20 may transmit the output data (the result of the estimation) regarding the entire video image after the estimation algorithm has performed estimation and tracking of an object regarding the entire video image.

The video image storing apparatus 40 is, for example, a storage apparatus. The video image storing apparatus 40 stores the video image that is used to evaluate the quality of the estimation algorithm in advance. The video image storing apparatus 40 stores the video image in association with ground truth data for each of the image frames. In other words, the ground truth data is associated with the image frame that forms the video image. The ground truth data indicates the position of an object captured in a corresponding image frame and the type of the object in this position. The type of the object may be, for example, a pedestrian, a bicycle, a motorcycle, an automobile, or a large vehicle. Further, the position of the object may be a position (a position of the pixel) on the image frame or may be positional information in an actual environment (e.g., an intersection) captured by an image frame. The positional information may be acquired, for example, by a Global Navigation Satellite System (GNSS).

Note that the tracking engine 20 may be implemented by the evaluation apparatus 100 that will be described later. That is, the evaluation apparatus 100 may operate the estimation algorithm. Likewise, the video image storing apparatus 40 may be implemented by the evaluation apparatus 100 that will be described later. That is, the evaluation apparatus 100 may store a video image associated with the ground truth data.

The evaluation apparatus 100 is, for example, a computer. The evaluation apparatus 100 is, for example, a server. The evaluation apparatus 100 may be implemented, for example, by cloud computing. The evaluation apparatus 100 (evaluation system 1) evaluates the quality of the estimation algorithm using a video image. Specifically, the evaluation apparatus 100 determines, for each of the objects, correct estimation (true estimation) or one of a plurality of types of false estimation (false estimation types) using the ground truth data that corresponds to the video image and the output data indicating the result of the estimation made by the estimation algorithm. The true estimation (result of true estimation) is a result of the estimation where a correct estimation has been made on an object. On the other hand, the false estimation type means a type of the result of erroneous estimation. That is, the false estimation type is the type of the result of the estimation (false estimation) in which erroneous estimation has been made on an object. In this embodiment, a plurality of false estimation types may occur. The details of the false estimation type will be described later.

Further, the evaluation apparatus 100 adds, for each of the plurality of false estimation types, the false estimation coefficient that corresponds to the false estimation type for the number of corresponding objects. The evaluation apparatus 100 calculates the total value of added values of false estimation coefficients obtained for each of the plurality of false estimation types. The evaluation apparatus 100 then calculates the evaluation value of the estimation algorithm based on the total value. This evaluation value may be such a value that the evaluation of the algorithm becomes lower as the aforementioned total value becomes larger. The details of the evaluation value will be described later.

Figure 3:
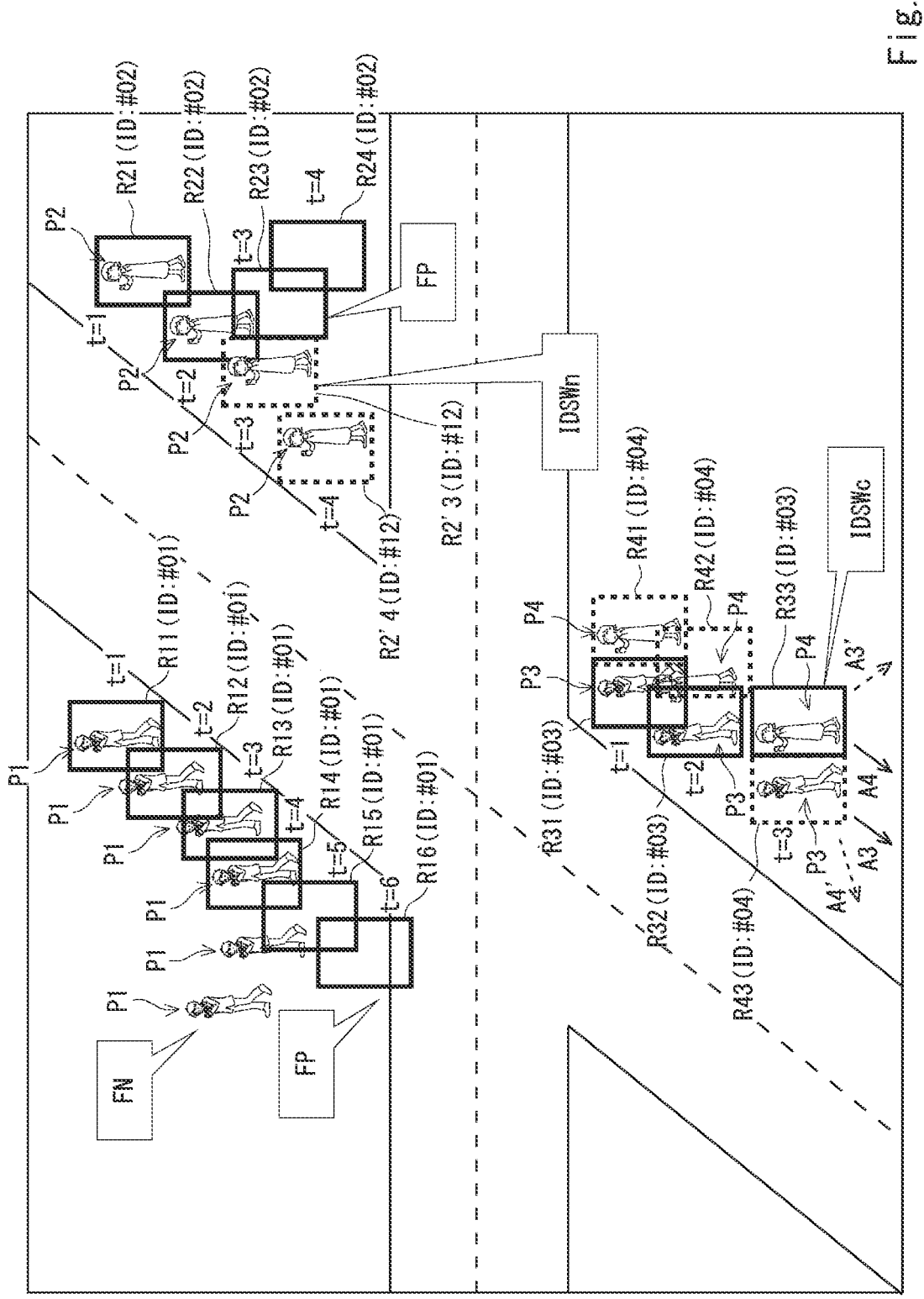
FIG. 3 is a diagram for describing false estimation types according to this embodiment.

FIGS. 2 and 3 are diagrams for describing the false estimation types according to this embodiment. FIG. 2 shows specific examples of the false estimation types. As shown in FIG. 2, in this embodiment, the results of the estimation include the correct estimation (true estimation) and the false estimation types. The "true estimation (TP: True Positive)" corresponds to a state in which the result of the estimation in the output of the estimation algorithm corresponds to an object that is present in the ground truth data. Further, the false estimation types include "false detection (false tracking)", "overlooking", "new false detection", and "switching".

The "false detection (FP: False Positive)" (a fourth false estimation) corresponds to a state in which the result of the estimation in the output of the estimation algorithm does not correspond to any one of the objects that are present in the ground truth data. In other words, "false detection" corresponds to a state in which the estimation algorithm has estimated (detected) an object in a position where there is actually no object. In other words, "false detection" is a false estimation type regarding a situation in which the estimation algorithm has erroneously estimated that an object that is not actually present is present. In other words, "false detection" is a false estimation type regarding a situation in which the estimation algorithm tracks an object that is actually present in another position. Therefore, when the false estimation of "false detection" occurs, in the result of the estimation made by the estimation algorithm, an identifier (ID) regarding an imaginary object or an object that is actually present in another position is given to a position where there is no object in the ground truth data.

The "overlooking (FN: False Negative)" (a first false estimation) corresponds to a state in which an object that is present in the ground truth data does not correspond to any one of the results of the estimation in the output of the estimation algorithm. That is, "overlooking" corresponds to a state in which an object that is present in the ground truth data is not estimated in the output of the estimation algorithm. In other words, "overlooking" corresponds to a state in which the estimation algorithm has failed to estimate (detect) an object in the position of an object that is actually present. In other words, "overlooking" is a false estimation type regarding a situation in which the estimation algorithm has failed to estimate (detect) an object included in the ground truth data. Therefore, when the false estimation of "overlooking" occurs, in the result of the estimation made by the estimation algorithm, an ID is not given to the object that is present in the ground truth data.

The "new false detection (IDSWn: ID Switch New; new ID granting)" (a third false estimation) corresponds to a state in which the estimation algorithm estimates that one object that is present in the ground truth data in the previous estimation processing is different from an object that is present in the ground truth data in the estimation processing this time. That is, "new false detection" corresponds to a state in which one object that is present in the ground truth data is estimated (detected) as objects different from each other between the result of the estimation at one timing and the result of the estimation at the next timing in the output of the estimation algorithm. In other words, "new false detection" corresponds to a state in which the estimation algorithm actually estimates (detects) that one object that is present at one timing is different from an object that is present at the next timing. In other words, "new false detection" is a false estimation type regarding a situation in which the estimation algorithm estimates that one object included in the ground truth data at one timing is different from the object included in the ground truth data at the next timing. Therefore, when the false estimation of "new false detection" occurs, in the result of the estimation made by the estimation algorithm, an ID that is given to one object that is present in the ground truth data at one timing is different from an ID that is given to the same object at the next timing.

The "switching (IDSWc: ID Switch Change; ID switching)" (a second false estimation) is a false estimation type regarding a situation in which the estimation algorithm estimates a plurality of objects included in the ground truth data in a switching manner between one timing and the next timing. That is, "switching" corresponds to a state in which a plurality of objects that are present in the ground truth data are estimated (detected) in a switched manner between the result of the estimation at one timing and the result of the estimation at the next timing in the output of the estimation algorithm. Therefore, when a false estimation of "switching" occurs, in the result of the estimation made by the estimation algorithm, the ID given to each of a plurality of objects that are present in the ground truth data at one timing is given to another one of the plurality of objects at the next timing. When, for example, objects A and B are present in the ground truth data, the ID that has been given to the position of the object A at one timing is given to the position of the object B at the next timing. Likewise, the ID that has been given to the position of the object B at one timing is given to the position of the object A at the next timing.

FIG. 3 illustrates the plurality of false estimation types and the correct estimation in video images. FIG. 3 illustrates results of the estimation in which the estimation processing is performed on a plurality of objects included in video images obtained by photographing an area near an intersection on the road. In FIG. 3, objects P (P1-P4) indicate objects included in the ground truth data. On the other hand, rectangles R (R11 etc.) indicate the positions regarding which the estimation algorithm has estimated that there are objects. Further, suppose the estimation is performed for each of the image frames in the example shown in FIG. 3. Then, t (t=1-6), which corresponds to each image frame, indicates a timing of the estimation at the corresponding image frame.

In the example shown in FIG. 3, for the object P1, at a timing (image frame) of t=1, the estimation algorithm performs correct estimation, as shown by the rectangle R11. At this time, "ID: #01" is given to the rectangle R11 that corresponds to this object P1. Further, for the moving object P1, the estimation algorithm performs correct estimation at timings (image frames) of t=2-4 as well, as shown by rectangles R12-R14, respectively. At this time, "ID: #01" that has been given at t=1 is continuously given to the rectangles R12-R14 that correspond to the object P1.

On the other hand, for the object P1, at a timing (image frame) of t=5, the estimation algorithm has not successfully made an estimation. That is, at t=5, for the object P1, false estimation of "overlooking (FN)" occurs. Likewise, at a timing (image frame) of t=6 as well, the estimation algorithm has not successfully made an estimation. That is, at t=6 as well, for the object P1, false estimation of "overlooking (FN)" occurs.

On the other hand, at the timing (image frame) of t=5, the estimation algorithm estimates that the object P1 is present in a position where there is no object P1, as shown by a rectangle R15. That is, at t=5, for the object P1, false estimation of "false detection (FP)" (false tracking) occurs. Likewise, at the timing (image frame) of t=6 as well, the estimation algorithm estimates that the object P1 is present in a position where there is no object P1, as shown by a rectangle R16. That is, at t=6 as well, for the object P1, false estimation of "false detection (FP)" occurs. At this time, "ID: #01" that has been given at t=1 is continuously given to the rectangles R15-R16.

Further, in the example shown in FIG. 3, for the object P2, at a timing (image frame) of t=1, the estimation algorithm performs correct estimation, as shown by a rectangle R21. At this time, "ID: #02" is given to the rectangle R21 that corresponds to this object P2. Further, for the moving object P2, the estimation algorithm performs correct estimation at a timing (image frame) of t=2 as well, as shown by a rectangle R22. At this time, "ID: #02" that has been given at t=1 is continuously given to the rectangle R22 that corresponds to the object P2.

In the meanwhile, at a timing (image frame) of t=3, the estimation algorithm estimates that the object P2 is present in a position where there is no object P2, as shown by a rectangle R23. That is, at t=3, for the object P2, false estimation of "false detection (FP)" occurs. Likewise, at a timing (an image frame) of t=4 as well, the estimation algorithm estimates that the object P2 is present in a position where there is no object P2, as shown by a rectangle R24. That is, at t=4 as well, for the object P2, false estimation of "false detection (FP)" occurs. At this time, "ID: #02" that has been given at t=1 is continuously given to the rectangles R23-R24.

On the other hand, for the object P2, at a timing (an image frame) of t=3, the estimation algorithm estimates that there is an object that is different from the object P2 regarding which the estimation has been made at t=1-2, as shown by a rectangle R2'3. That is, at t=3, for the object P2, false estimation of "new false detection (IDSWn)" occurs. At this time, "ID: #12", which is different from "ID: #02" that has been given at t=1 and corresponds to the object P2, is erroneously given to the rectangle R2'3. Further, at a timing (an image frame) of t=4, the estimation algorithm estimates that the detected object is the same as the object (object P2) regarding which the estimation has been made at t=3, as shown by a rectangle R2'4. In this case, the estimation algorithm estimates that the object P2 in the previous estimation processing is the same as the object P2 in the estimation processing this time. Therefore, this result of the estimation is correct estimation (TP). At this time, "ID: #12", which is the same as the ID given to the rectangle R2'3 at t=3, is given to the rectangle R2'4.

Further, in the example shown in FIG. 3, an object P3 and an object P4 are moving in close to each other. For the object P3, at a timing (image frame) of t=1, the estimation algorithm performs correct estimation, as shown by a rectangle R31. At this time, "ID: #03" is given to the rectangle R31 that corresponds to this object P3. Further, for the moving object P3, at a timing (image frame) of t=2 as well, the estimation algorithm performs correct estimation, as shown by a rectangle R32. At this time, "ID: #03" that has been given at t=1 is continuously given to the rectangle R32 that corresponds to the object P3.

Further, for the object P4, at a timing (image frame) of t=1, the estimation algorithm performs correct estimation, as shown by a rectangle R41. At this time, "ID: #04" is given to the rectangle R41 that corresponds to this object P4. Further, for the moving object P4, at a timing (image frame) of t=2 as well, the estimation algorithm performs correct estimation, as shown by a rectangle R42. At this time, "ID: #04" given at t=1 is continuously given to the rectangle R42 that corresponds to the object P4.

Meanwhile, at a timing (image frame) of t=3, the estimation algorithm estimates that the object P4 is present in the position where the object P3 is present, as shown by a rectangle R43. Further, at a timing (image frame) of t=3, the estimation algorithm estimates that the object P3 is present in the position where the object P4 is present, as shown by a rectangle R33. That is, at t=3, the estimation algorithm erroneously estimates the object P3 as the object P4 and erroneously estimates the object P4 as the object P3. Therefore, at t=3, for the object P3 and the object P4, false estimation of "switching (IDSWc)" occurs. At this time, the "ID: #04" given to the object P4 at t=1-2 is erroneously given to the rectangle R43. Further, the "ID: #03" given to the object P3 at t=1-2 is erroneously given to the rectangle R33.

Suppose, as shown in FIG. 2, the false estimation coefficient regarding "false detection (FP)" is denoted by $\alpha$. The false estimation coefficient regarding "overlooking (FN)" is denoted by $\beta$. The false estimation coefficient regarding "new false detection (IDSWn)" is denoted by $\gamma$. The false estimation coefficient regarding "switching (IDSWc)" is denoted by $\delta$. Here, the false estimation coefficients function as weights of the plurality of respective false estimation types in an evaluation expression used to evaluate the estimation algorithm. Then, the false estimation coefficients are provided in such a way that different false estimation types have different false estimation coefficients. As a false estimation having a larger false estimation coefficient occurs among the plurality of false estimation types, the evaluation value of the evaluation expression of the estimation algorithm may become lower.

When the estimation algorithm is used in traffic control such as a self-driving car control system, the estimation algorithm estimates the position of an object such as a pedestrian and tracks the object such as the pedestrian. It is possible to estimate the moving direction and the speed of the object such as the pedestrian using the results of the estimation at a plurality of timings (image frames) of the estimation algorithm. Specifically, the speed of the object may be calculated using the moving distance calculated from the difference (distance) in the positions in the respective image frames of the object and the frame rate. That is, the speed of the object may be calculated using the moving distance of the object and the time from acquisition of one image frame to acquisition of the next image frame. Further specifically, the positions of the pixels on the respective image frames and the positions on the actual environment where the images have been captured may be associated with each other using the angle of view or the like of a camera that has captured the video image. Then, the estimation algorithm may estimate the position (actual position) of this object in the actual environment from, for example, the position of the pixel that corresponds to the lower end (e.g., a foot of a pedestrian) of the object. Then, the estimation algorithm may calculate the difference between the actual position of the object regarding one image frame and the actual position of the object regarding the next image frame as a moving distance of this object. Then, the estimation algorithm may estimate the speed of the object by the moving distance and the frame rate. Further, the moving direction of the object may be calculated by calculating the direction from the actual position of the object in the previous image frame to the actual position of the object in the image frame this time.

Further, by estimating the moving direction and the speed of the object such as a pedestrian, it is possible to predict the possibility that this object may reach a specific position (e.g., an intersection or a roadway) and the time of arrival when the object reaches the specific position. Therefore, it is possible to perform control in such a way that the travelling vehicle is prevented from colliding with an object using the result of the estimation made by the estimation algorithm.

When the estimation algorithm is used in the environment of traffic control as described above, the risks in cases in which the aforementioned respective false estimation types have occurred may differ from one another. Then, in this embodiment, as the risk of each of the false estimation types is larger, the value of the corresponding false estimation coefficient is set higher. In other words, the false estimation coefficient is set to be higher as the degree (severity) of the impact by the corresponding false estimation type becomes larger. That is, the false estimation coefficient is set in accordance with the degree of impact (severity) by the corresponding false estimation type.

When "false detection" has occurred, control such as collision avoidance may be performed assuming that an object that is not actually present is estimated to be present. In this case, the control becomes excessive (extra), but this control is for the safety in the traffic control. Therefore, the risk in the case in which "false detection" has occurred is small. In other words, the degree of impact in the case in which "false detection" has occurred is small. Therefore, the false estimation coefficient $\alpha$ that corresponds to "false detection" may be set relatively low.

When "overlooking" has occurred, it is estimated that there is no object in a position where an object is actually present. Therefore, it is possible that control of collision avoidance on this object may not be performed. In this case, in terms of traffic control, it is possible that control of collision avoidance, which is required for the traffic control, may not be performed. Therefore, the risk in the case in which "overlooking" has occurred is high. In other words, the degree of impact in the case in which "overlooking" has occurred is large. Therefore, the false estimation coefficient $\beta$ that corresponds to "overlooking" may be set relatively high.

When "switching" has occurred, it is estimated that some object is present in the position where an object is actually present. Therefore, the degree of impact (risk) is smaller than that of a case in which "overlooking" has occurred. However, if IDs are switched in the middle of the estimation processing, as will be described below, it is possible that the moving direction and the speed of each of the plurality of objects may not be estimated with a high accuracy.

In the example shown in FIG. 3, for example, from the actual moving trajectory of the object P3 at t=1-3, the object P3 should probably be predicted to actually move in the direction shown by an arrow A3. However, if the result of the estimation made by the estimation algorithm is used, it is possible that the object that corresponds to the "ID: #03" may be predicted to move in the direction shown by a dashed line arrow A3' from the moving trajectory of the rectangles R31, R32, and R33 to which "ID: #03" is given. Likewise, from the actual moving trajectory of the object P4 at t=1-3, it is possible that the object P4 should actually be predicted to move in the direction shown by an arrow A4. However, if the result of the estimation made by the estimation algorithm is used, it is possible that the object that corresponds to "ID: #04" is predicted to move in the direction shown by a dashed line arrow A4' from the moving trajectory of the rectangles R41, R42, and R43 to which the "ID: #04" is given.

Likewise, as will be described below, it is possible that the moving speeds of the objects P3 and P4 may not be predicted with a high accuracy. In particular, when the difference between the actual moving speed (speed per hour) of the object P3 and the actual moving speed (speed per hour) of the object P4 is large, it is possible that the moving speeds of them may not be predicted with a high accuracy.

Specifically, assume that the object P3 moves faster than the object P4 although both the objects P3 and P4 are moving at substantially constant speeds in the example shown in FIG. 3. In this case, the difference (moving distance) between the position of the object P3 at t=3 and the position of the object P3 at t=2 is actually about the same as the difference (moving distance) between the position of the object P3 at t=2 and the position of the object P3 at t=1. On the other hand, the difference between the position of the rectangle R33 and the position of the rectangle R32 may be smaller than the difference between the position of the rectangle R32 and the position of the rectangle R31. Therefore, it is possible that it is estimated that the speed of the object (object P3) that corresponds to "ID: #03" has suddenly become low. Therefore, it is possible that the speed of the object that corresponds to the "ID: #03" after that may be predicted to be lower than the actual speed of the object P3.

Likewise, the difference between the position of the object P4 at t=3 and the position of the object P4 at t=2 is substantially the same as the difference between the position of the object P4 at t=2 and the position of the object P4 at t=1. On the other hand, the difference between the position of the rectangle R43 and the position of the rectangle R42 may be larger than the difference between the position of the rectangle R42 and the position of the rectangle R41. Therefore, it is possible that it is estimated that the speed of the object (object P4) that corresponds to "ID: #04" has suddenly become high. Therefore, it is possible that it is also predicted that the speed of the object that corresponds to the "ID: #04" after that may be predicted to be higher than the actual speed of the object P4.

As described above, in the traffic control, from estimating the moving direction and the moving speed of an object, it is possible to predict in how many seconds the object will arrive at a specific position such as an intersection. Accordingly, it is possible to perform control of collision avoidance. However, if the moving direction and the moving speed of the object cannot be estimated with a high accuracy, it is possible that the aforementioned time of arrival may not be predicted with a high accuracy. Therefore, it is possible that the control of the collision avoidance may not be appropriately performed. Therefore, the degree of impact (risk) when "switching" has occurred is somewhat large.

When "new false detection" has occurred, it is estimated that some object is present in the position where an object is actually present. Therefore, the degree of impact (risk) is smaller than that in the case in which "overlooking" has occurred. However, since one object has not been successfully tracked correctly, it is possible that the moving direction and the moving speed of the object cannot be estimated with a high accuracy, like in the case in which "switching" has occurred. On the other hand, after a new ID is given, it is possible that correct estimation may be performed. Therefore, the degree of impact (risk) of "new false detection" is smaller than the degree of impact (risk) of "switching".

For example, in the example shown in FIG. 3, the ID that is given to the object P2 at t=2 is different from the ID that is given to the same object P2 at t=3. Therefore, it is impossible to estimate the moving direction and the moving speed of the object P2 from the difference between the position of the object P2 (rectangle R2'3) at t=3 and the position of the object P2 (rectangle R22) at t=2. On the other hand, the same ID (ID: #12) is given to the object P2 at t=3 and t=4. Therefore, it is possible to appropriately estimate the moving direction and the moving speed of the object P2 from the difference between the position of the object P2 (rectangle R2'4) at t=4 and the position of the object P2 (rectangle R2'3) at t=3. It is further assumed that the moving direction and the moving speed of the object P2 are substantially constant. In this case, the moving direction and the moving speed of the object P2 (ID: #02) estimated from the moving trajectory at t=1-2 may be substantially the same as the moving direction and the moving speed of the object P2 (ID: #12) estimated from the moving trajectory at t=3-4, respectively. Therefore, the degree of impact when "new false detection" has occurred is smaller than the degree of impact of "switching". Therefore, the degree of impact (risk) when "new false detection" has occurred is somewhat small.

From the above discussion, the false estimation coefficients $\alpha$, $\beta$, $\gamma$, and $\delta$ are set as shown in the following Expression (1). In the first embodiment, it is assumed that the false estimation coefficients are constant (they are not changed from initial values).

[Expression 1]

$$\beta > (\gamma+\delta) > \alpha$$

$$1 > \delta > \gamma = 1-\delta > 0 \qquad (1)$$

That is, since the degree of impact of "overlooking (FN)" is the largest, the false estimation coefficient $\beta$ that corresponds to "overlooking (FN)" (the first false estimation) is set to be higher than the false estimation coefficients ($\alpha$, $\gamma$, $\delta$) that correspond to the other false estimation types. Further, the degree of impact of "switching (IDSWc)" is larger than that of the "new false detection (IDSWn)". Therefore, the false estimation coefficient $\delta$ that corresponds to "switching (IDSWc)" (the second false estimation) is set to be higher than the false estimation coefficient $\gamma$ that corresponds to the "new false detection (IDSWn)". Further, $\gamma+\delta=1$ is established.

Further, in the first embodiment, the evaluation expression that is used to evaluate the estimation algorithm in the image frame acquired at the timing t can be expressed as shown in the following Expression (2).

[Expression 2]

$$F(t) = 1 - \frac{\alpha \times FP(t) + \beta \times FN(t) + \gamma \times IDSWn(t) + \delta \times IDSWc(t)}{GT(t)} \qquad (2)$$

In Expression (2), GT(t) denotes the actual number of objects included in the ground truth data corresponding to the image frame at the timing t. Further, FP(t) denotes the number of objects (rectangles) that have been falsely estimated as "false detection (FP)" for the image frame at the timing t. Further, FN(t) denotes the number of objects that have been falsely estimated as "overlooking (FN)" for the image frame at the timing t. Further, IDSWn(t) denotes the number of objects (rectangles) that have been falsely estimated as "new false detection (IDSWn)" for the image frame at the timing t. Further, IDSWc(t) denotes the number of objects (rectangles) that have been falsely estimated as "switching (IDSWc)" for the image frame at the timing t.

The numerator of the fraction in the second term on the right-hand side of Expression (2) corresponds to the total value of values obtained by multiplying the numbers of objects that correspond to the plurality of respective false estimation types with the corresponding false estimation coefficients ($\alpha \times FP(t)$, $\beta \times FN(t)$, $\gamma \times IDSWn(t)$, and $\delta \times IDSWc(t)$). It can be said that the values obtained by multiplying the numbers of objects that correspond to the plurality of respective false estimation types with the corresponding false estimation coefficients is equal to the value obtained by adding the corresponding false estimation coefficient for the number of objects that corresponds to each of the plurality of false estimation types. For example, "β×FN(t)" corresponds to a value (Σβ) obtained by adding the false estimation coefficient β for the number of objects FN(t) that correspond to "overlooking (FN)". Therefore, this total value is a total value obtained by adding the corresponding false estimation coefficient for the number of objects that corresponds to each of the plurality of false estimation types and then adding the added values of the false estimation coefficients obtained for each of the plurality of false estimation types. As shown in Expression (2), as this total value becomes larger, the evaluation value F(t) becomes smaller. That is, as this total value becomes larger, the evaluation of the estimation algorithm becomes lower.

In Luiten2021, the evaluation value of the estimation algorithm is calculated, assuming that all the false estimation coefficients in Expression (2) are 1. Therefore, in Luiten2021, the evaluation value has been calculated without taking into consideration the risks of the plurality of respective false estimation types, that is, the degrees of impact (severity) of false estimations. Therefore, even when the technique of Luiten2021 is applied, just because the evaluation of the estimation algorithm is high does not mean that a false estimation with a high risk (the degree of impact) is not made. Therefore, it is possible that the quality of the estimation algorithm may not be appropriately evaluated. That is, if, for example, the number of objects that correspond to "overlooking (FN)" is large in one estimation algorithm and the number of objects that correspond to "false detection (FP)" is large in another estimation algorithm, it is possible that the qualities of these estimation algorithms are about the same.

Meanwhile, in the first embodiment, the false estimation coefficients are provided in such a way that different false estimation types have different false estimation coefficients. Specifically, the false estimation coefficient is set to be higher as the degree of impact of the corresponding false estimation type becomes larger. Therefore, as false estimation with a large degree of impact is made more frequently, the evaluation value may become smaller. In other words, as a false estimation with a high degree of impact is made more frequently, the evaluation of the estimation algorithm may become lower. It can be said here that the quality of the estimation algorithm that makes a false estimation with a high degree of impact frequently is low. Therefore, in the first embodiment, it becomes possible to appropriately evaluate the quality of the estimation algorithm. That "the false estimation coefficient is high" is not limited to the numerical value of the false estimation coefficient being simply large. The numerical value of the false estimation coefficient may become smaller as the degree of impact becomes larger. In this case, that "the false estimation coefficient is high" corresponds to the numerical value of the false estimation coefficient being small. Further, in this case, as "the total value obtained by adding the corresponding false estimation coefficient for the number of objects that corresponds to each of the plurality of false estimation types and then adding the added values of the false estimation coefficients obtained for each of the plurality of false estimation types" is smaller, the evaluation of the estimation algorithm may become lower.

Further, in the first embodiment, the false estimation coefficient β that corresponds to "overlooking (FN)" (the first false estimation) among the plurality of false estimation types is set to be higher than the false estimation coefficients that correspond to the other false estimation types. As described above, the degree of impact of "overlooking (FN)" is the largest among the plurality of false estimation types. Therefore, by setting the false estimation coefficient β to be higher than the false estimation coefficients that correspond to the other false estimation types, it is possible to evaluate the quality of the estimation algorithm more appropriately. That is, it is possible to lower the evaluation of the estimation algorithm that frequently performs "overlooking (FN)" whose degree of impact is large.

Further, in the first embodiment, the false estimation coefficient δ that corresponds to "switching (IDSWc)" (the second false estimation) is set to be higher than the false estimation coefficient γ that corresponds to "new false detection (IDSWn)" (the third false estimation). As described above, the degree of impact of "switching (IDSWc)" is larger than the degree of impact of "new false detection (IDSWn)". Therefore, by setting the false estimation coefficient δ to be higher than the false estimation coefficient γ, it becomes possible to evaluate the quality of the estimation algorithm more appropriately. That is, it is possible to lower the evaluation of the estimation algorithm that frequently performs "switching (IDSWc)" whose degree of impact is larger than that of "new false detection (IDSWn)".

Figure 4:
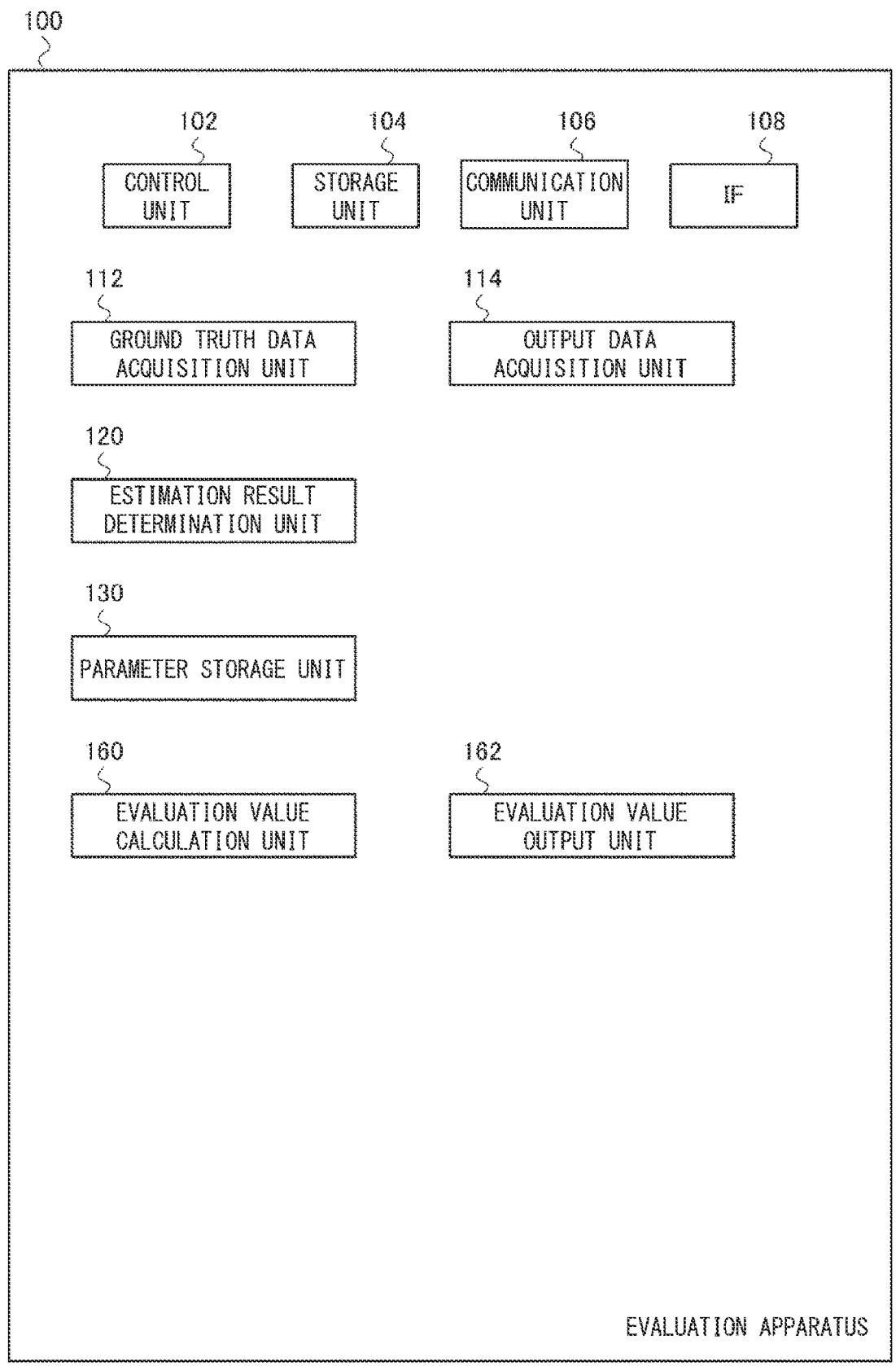
FIG. 4 is a diagram showing a configuration of an evaluation apparatus according to the first embodiment.

FIG. 4 is a diagram showing a configuration of the evaluation apparatus 100 according to the first embodiment. As shown in FIG. 4, the evaluation apparatus 100 includes, as main hardware configurations, a control unit 102, a storage unit 104, a communication unit 106, and an interface unit 108 (IF; Interface). The control unit 102, the storage unit 104, the communication unit 106, and the interface unit 108 are connected to one another via a data bus or the like. Note that the tracking engine 20 and the video image storing apparatus 40 may also include the hardware configuration of the evaluation apparatus 100 shown in FIG. 4.

The control unit 102 is, for example, a processor such as a Central Processing Unit (CPU). The control unit 102 has a function as an arithmetic apparatus that performs, for example, control processing and arithmetic processing. The control unit 102 may include a plurality of processors. The storage unit 104 is, for example, a storage device such as a memory or a hard disc. The storage unit 104 is, for example, a Read Only Memory (ROM) or a Random Access Memory (RAM). The storage unit 104 has a function for storing, for example, a control program(s) and an arithmetic program(s) executed by the control unit 102. That is, the storage unit 104 (memory) stores one or more instructions. Further, the storage unit 104 has a function for temporarily storing processing data and the like. The storage unit 104 may include a database. Further, the storage unit 104 may include a plurality of memories.

The communication unit 106 performs processing necessary for communicating with other apparatuses such as the tracking engine 20 or the video image storing apparatus 40 via a network. The communication unit 106 may include, for example, a communication port, a router, and a firewall. The interface unit 108 (IF; Interface) is, for example, a user interface (UI). The interface unit 108 includes an input device such as a keyboard, a touch panel, or a mouse, and an output device such as a display or a speaker. The interface unit 108 may be configured in such a way that the input device and the output device are integrated, like a touch screen (touch panel). The interface unit 108 receives an operation of inputting data performed by a user (operator) and outputs information to the user.

The evaluation apparatus 100 according to the first embodiment includes, as components, a ground truth data acquisition unit 112, an output data acquisition unit 114, an estimation result determination unit 120, a parameter storage unit 130, an evaluation value calculation unit 160, and an evaluation value output unit 162. Note that each of the aforementioned components may be implemented, for example, by executing a program under the control of the control unit 102. More specifically, each of the components may be implemented by the control unit 102 executing a program (instruction) stored in the storage unit 104. Further, each of the components may be implemented by installing a necessary program stored in any nonvolatile recording medium as required. Further, each of the components is not necessarily implemented by software executed by a program, and may instead be implemented, for example, by any combination of hardware, firmware, and software. Further, each of the components may also be implemented using a user-programmable integrated circuit, such as a field-programmable gate array (FPGA) or a microcomputer. In this case, a program formed of each of the aforementioned components may be implemented by using this integrated circuit. The same is applicable to a second embodiment that will be described later.

The ground truth data acquisition unit 112 acquires, from the video image storing apparatus 40, the ground truth data that corresponds to the video data on which the estimation algorithm has performed the estimation processing and the tracking processing. The ground truth data acquisition unit 112 may the acquire ground truth data for each of the image frames that form video images. The output data acquisition unit 114 acquires output data by the estimation processing and the tracking processing performed by the estimation algorithm from the tracking engine 20. The output data acquisition unit 114 may acquire the output data for each of the image frames that form video images.

The estimation result determination unit 120 determines the result of the estimation for each of the image frames using the ground truth data and the output data that have been acquired. Specifically, the estimation result determination unit 120 determines, for each of the objects, the correct estimation result or one of the plurality of false estimation types by comparing the ground truth data with the output data. Further specifically, the estimation result determination unit 120 determines which one of "true estimation (TP)", "false detection (FP)", "overlooking (FN)", "new false detection (IDSWn)", and "switching (IDSWc)" the result of the estimation regarding each of the objects (rectangles) corresponds to. Further specifically, the estimation result determination unit 120 determines the result of the estimation by determining whether the type and the position of the object included in the ground truth data have been correctly estimated in the output data. Further, the estimation result determination unit 120 determines the result of the estimation by determining whether the same ID is given to the same object included in the ground truth data in a series of image frames.

In the example shown in FIG. 3, for the image frame at t=1, the position of the rectangle R11 corresponds to the position of the object P1. Therefore, the position of the object P1 included in the ground truth data is correctly estimated. Therefore, the estimation result determination unit 120 determines that the result of the estimation of the object P1 is "true estimation (TP)". Likewise, the estimation result determination unit 120 determines that the results of the estimation of the other objects P2-P4 are also "true estimation (TP)".

Further, for the image frame at t=2, the position of the rectangle R12 corresponds to the position of the object P1. Therefore, the position of the object P1 included in the ground truth data is correctly estimated. Further, the ID (#01) given to the rectangle R12 is the same as the ID given to the rectangle R11 at t=1. Therefore, the estimation result determination unit 120 determines that the result of the estimation of the object P1 is "true estimation (TP)". Likewise, the estimation result determination unit 120 determines that the results of the estimation of the other objects P2-P4 are "true estimation (TP)" as well. Further, for the image frames at t=3-4 as well, the estimation result determination unit 120 determines that the result of the estimation of the object P1 is "true estimation (TP)", like in the above description.

Further, for the image frame at t=3, the position of the rectangle R2'3 corresponds to the position of the object P2. However, the ID (#12) given to the rectangle R2'3 is different from the ID (#02) given to the rectangle R22 that corresponds to the object P2 at t=2. Therefore, the estimation result determination unit 120 determines that the result of the estimation of the rectangle R2'3 that corresponds to the object P2 is "new false detection (IDSWn)". On the other hand, for the image frame at t=4, the position of the rectangle R2'4 corresponds to the position of the object P2, and the ID (#12) given to the rectangle R2'4 is the same as the ID (#12) given to the rectangle R2'3 that corresponds to the object P2 at t=3. Therefore, the estimation result determination unit 120 determines that the result of the estimation of the object P2 (rectangle R2'4) is "true estimation (TP)".

Further, although it is estimated, for the image frame at t=3, that the object P2 is present in the position of the rectangle R23, there is no object in the position of the rectangle R23. Therefore, the estimation result determination unit 120 determines that the result of the estimation of the rectangle R23 which is near the object P2 is "false detection (FP)". The same is applicable also to the image frame at t=4.

Further, for the image frame at t=3, the position of the rectangle R33 corresponds to the position of the object P4. Here, the ID (#03) given to the rectangle R33 is different from the ID (#04) given to the rectangle R42 that corresponds to the object P4 at t=2 and is the same as the ID (#03) given to the rectangle R32 that corresponds to the object P3 at t=2. Therefore, the estimation result determination unit 120 determines that the result of the estimation of the object P4 is "switching (IDSWc)".

Likewise, for the image frame at t=3, the position of the rectangle R43 corresponds to the position of the object P3. Here, the ID (#04) given to the rectangle R43 is different from the ID (#03) given to the rectangle R32 that corresponds to the object P3 at t=2 and is the same as the ID (#04) given to the rectangle R42 that corresponds to the object P4 at t=2. Therefore, the estimation result determination unit 120 determines that the result of the estimation of the object P3 is "switching (IDSWc)".

Further, although it is estimated, for the image frame at t=5, that the object P1 is present in the position of the rectangle R15, there is no object in the position of the rectangle R15. Therefore, the estimation result determination unit 120 determines that the result of the estimation of the rectangle R15 near the object P1 is "false detection (FP)". The same is applicable also to the image frame at t=6.

Further, for the image frame at t=5, there is no rectangle in the position that corresponds to the object P1. Therefore, the estimation result determination unit 120 determines that the result of the estimation of the object P1 is "overlooking (FN)". The same is applicable also to the image frame at t=6.

Further, the estimation result determination unit 120 counts, for each of the image frames, the numbers of objects (rectangles) that correspond to true estimation and each of the false estimation types. Specifically, the estimation result determination unit 120 counts, for each of the image frames, the number of objects determined to be "true estimation (TP)". Likewise, the estimation result determination unit 120 counts, for each of the image frames, the number of objects determined to be "overlooking (FN)". Likewise, the estimation result determination unit 120 counts, for each of the image frames, the number of objects determined to be "switching (IDSWc)". Further, the estimation result determination unit 120 counts, for each of the image frames, the number of rectangles determined to be "false detection (FP)". Likewise, the estimation result determination unit 120 counts, for each of the image frames, the number of rectangles determined to be "new false detection (IDSWn)".

In the example shown in FIG. 3, in the image frame at t=3, the estimation result determination unit 120 counts the number of pieces of "true estimation (TP)" as 1. Likewise, in the image frame at t=3, the estimation result determination unit 120 counts the number of pieces of "false detection (FP)" as 1, counts the number of pieces of "new false detection (IDSWn)" as 1, and counts the number of pieces of "switching (IDSWc)" as 2. Further, in the image frame at t=5, the estimation result determination unit 120 counts the number of pieces of "false detection (FP)" as 1 and the number of pieces of "overlooking (FN)" as 1.

The parameter storage unit 130 stores parameters used for calculating the evaluation value. In the first embodiment, the parameter storage unit 130 stores the aforementioned false estimation coefficients $\alpha$, $\beta$, $\gamma$, and $\delta$. Further, the parameter storage unit 130 may temporarily store the evaluation value F(t) calculated for each of the image frames by the processing that will be described later.

The evaluation value calculation unit 160 calculates the evaluation value of the estimation algorithm. Specifically, the evaluation value calculation unit 160 calculates the evaluation value using the evaluation expression shown in Expression (2). The evaluation value calculation unit 160 calculates the evaluation value for each of the image frames (timing t). Then, when the evaluation values have been calculated for all the image frames, the evaluation value calculation unit 160 adds up the evaluation values calculated for all the image frames, as shown in the following Expression (3), to calculate the whole evaluation value F, which is an evaluation value for the entire video image of the estimation algorithm. When, for example, the estimation algorithm has performed the estimation processing (the tracking processing) on a video image for five minutes whose frame rate is 10 fps, the evaluation value calculation unit 160 adds up the evaluation values obtained from 10×60×5=3000 image frames to calculate the whole evaluation value F.

[Expression 3]

$$F = \sum_{t} F(t) \quad (3)$$

The evaluation value output unit 162 outputs the evaluation value calculated by the evaluation value calculation unit 160. The evaluation value output unit 162 may display, for example, the evaluation value on a display of the interface unit 108. Further, the evaluation value output unit 162 may control, for example, the communication unit 106 and cause a display of another apparatus (e.g., a user terminal) to display the evaluation value. The evaluation value output unit 162 may output the evaluation value by, for example, voice. The evaluation value output unit 162 may output the whole evaluation value F or may output the evaluation value F(t) for each of the image frames.

Figure 5:
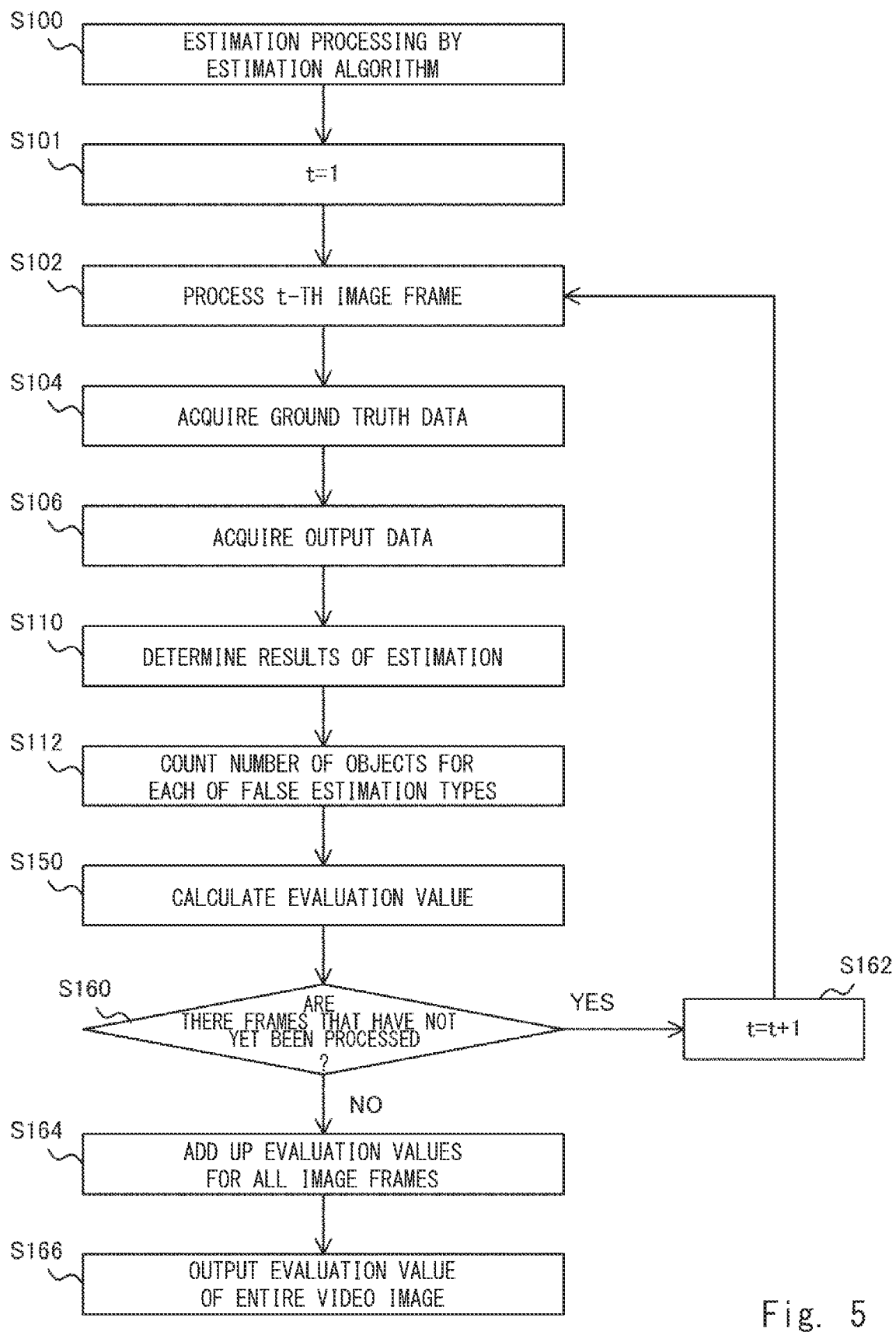
FIG. 5 is a flowchart showing an evaluation method executed by the evaluation system according to the first embodiment.

FIG. 5 is a flowchart showing an evaluation method executed by the evaluation system 1 according to the first embodiment. The processing shown in FIG. 5 may be mainly executed by the evaluation apparatus 100. First, the estimation processing by the estimation algorithm is performed by the tracking engine 20 (Step S100). The processing of S101 and the following processing may be executed after the estimation processing (S100) has been executed for all the image frames.

Assuming that t=1 (Step S101), the evaluation apparatus 100 processes the t-th image frame (the image frame at the timing t) (Step S102). That is, the evaluation apparatus 100 first processes the first image frame. Then, the evaluation apparatus 100 performs processing of S104-S150 that will be described later for the first image frame. If there are image frames that have not yet been processed (YES in S160), the evaluation apparatus 100 increments t by one (Step S162) and the second image frame is to be processed (S102). In the following processing, the evaluation apparatus 100 performs the processing of S104-S150 for the t-th image frame.

The ground truth data acquisition unit 112 acquires, for the t-th image frame, the ground truth data (Step S104). The output data acquisition unit 114 acquires output data related to the estimation processing executed for the t-th image frame (Step S106). The estimation result determination unit 120 determines the results of the estimation regarding the t-th image frame as described above (Step S110). Specifically, the estimation result determination unit 120 determines, for the t-th image frame, whether objects and rectangles are estimated to be "true estimation (TP)", "false detection (FP)", "overlooking (FN)", "new false detection (IDSWn)", or "switching (IDSWc)". As described above, the estimation result determination unit 120 counts the number of objects for each of the false estimation types (Step S112). The evaluation value calculation unit 160 calculates, for the t-th image frame, the evaluation value of the estimation algorithm using the evaluation expression shown in Expression (2) (Step S150).

Then, the evaluation apparatus 100 determines whether or not there are image frames that have not yet been processed (Step S160). If there are image frames that have not yet been processed (YES in S160), the evaluation apparatus 100 increments t by one (Step S162). Then, the process flow goes back to S102, and the evaluation apparatus 100 now processes the next image frame (S102). Then, the processing of S104-S150 is repeated.

On the other hand, when there is no image frame that has not yet been processed (NO in S160), the evaluation value calculation unit 160 adds up the evaluation values obtained for all the image frames, as shown in Expression (3) (Step S164). Then, the evaluation value output unit 162 outputs the evaluation value of the entire video image (Step S166).

Second Embodiment

Next, a second embodiment will be described. Since the configuration of an evaluation system 1 according to the second embodiment is substantially the same as that of the evaluation system 1 according to the first embodiment shown in FIG. 1, the descriptions thereof will be omitted. An evaluation apparatus 100 according to the second embodiment is different from the evaluation apparatus 100 according to the first embodiment in that the false estimation coefficient may differ for each of the objects and may change for each of the image frames in the evaluation apparatus 100 according to the second embodiment.

Figure 6:
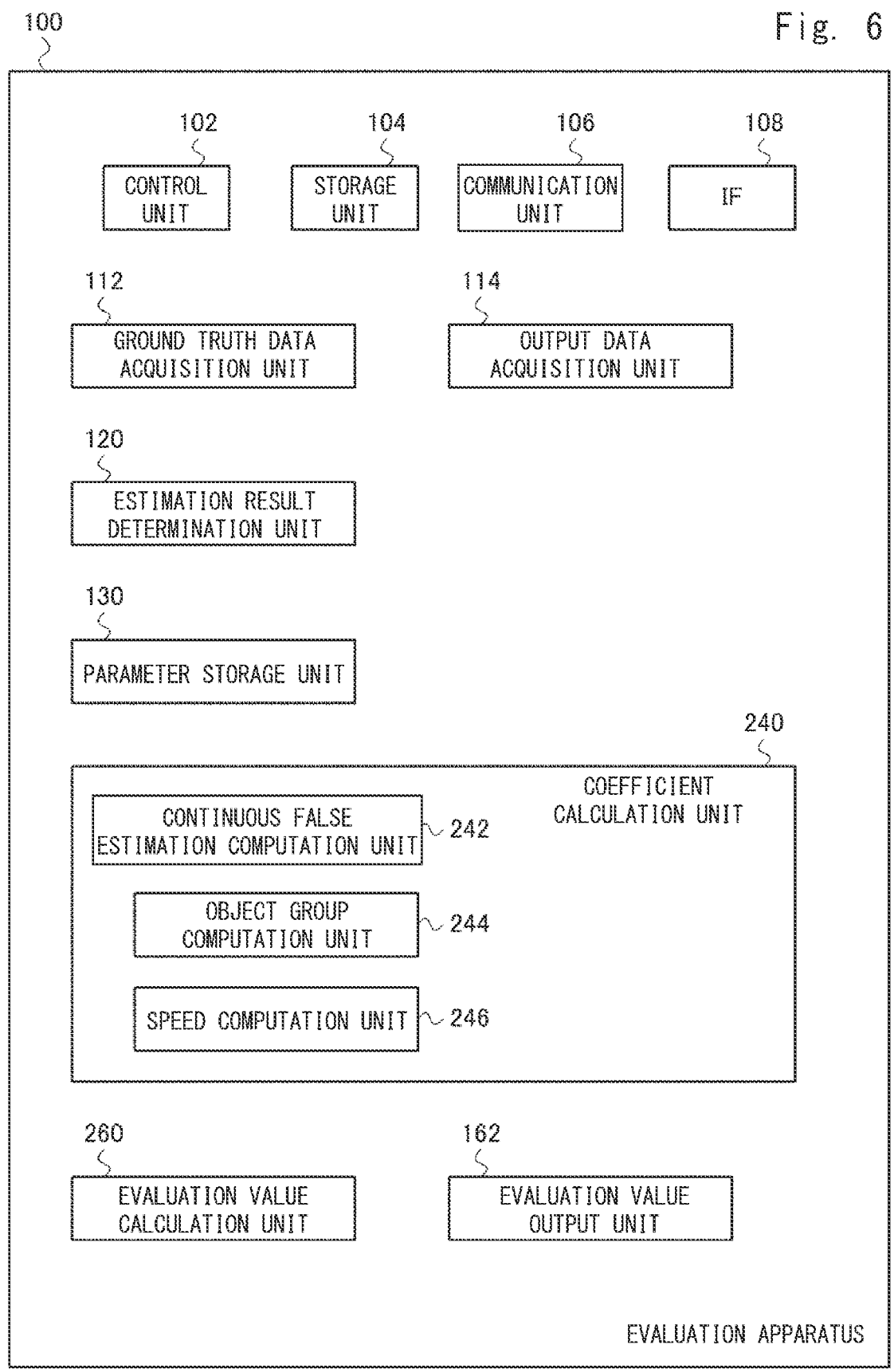
FIG. 6 is a diagram showing a configuration of an evaluation apparatus according to a second embodiment.

FIG. 6 is a diagram showing a configuration of the evaluation apparatus 100 according to the second embodiment. Like in the first embodiment, the evaluation apparatus 100 according to the second embodiment includes, as main hardware components, a control unit 102, a storage unit 104, a communication unit 106, and an interface unit 108. Further, the evaluation apparatus 100 according to the second embodiment includes, as components, a ground truth data acquisition unit 112, an output data acquisition unit 114, an estimation result determination unit 120, a parameter storage unit 130, a coefficient calculation unit 240, an evaluation value calculation unit 260, and an evaluation value output unit 162. The coefficient calculation unit 240 includes a continuous false estimation computation unit 242, an object group computation unit 244, and a speed computation unit 246.

Since the functions of the ground truth data acquisition unit 112, the output data acquisition unit 114, the estimation result determination unit 120, the parameter storage unit 130, and the evaluation value output unit 162 are substantially similar to those described in the first embodiment, the descriptions thereof will be omitted. The parameter storage unit 130 may store constants used for calculating false estimation coefficients, such as "a" in Expression (4) and "c" in Expression (6) that will be described later. Further, the parameter storage unit 130 may temporarily store the false estimation coefficient calculated for each of the objects (rectangles) and for each of the image frames by the processing that will be described later.

The coefficient calculation unit 240 calculates, for each of the image frames, a false estimation coefficient, which is a variable. That is, the coefficient calculation unit 240 calculates the false estimation coefficient for each timing of estimation. Further, the coefficient calculation unit 240 calculates the false estimation coefficients for each of the objects (rectangles) determined to be one of the plurality of false estimation types in the image frame. The processing of the continuous false estimation computation unit 242, the object group computation unit 244, and the speed computation unit 246 for one object may be executed in parallel with each other or may be sequentially executed. When they are executed in parallel with each other, the coefficient calculation unit 240 may set the total value or the average value of the values calculated in the above processing as the false estimation coefficient regarding this object. The above case in which they are sequentially executed will be described with reference to FIG. 8.

The state of the object that corresponds to each false estimation type may vary for each of the objects even when the false estimation type is the same. Further, even when the false estimation type is the same, the degree of impact of the false estimation may vary as well in accordance with the state of the object. Further, the state of the object that corresponds to each false estimation type changes for each of the image frames. Then, in accordance with the change in the state of the object, the degree of impact of the false estimation is changed as well. Further, the degree of impact of the false estimation of each false estimation type may change in accordance with occurrence of the false estimation in the previous image frame. In this manner, the degree of impact of the false estimation of each false estimation type may not be constant throughout the entire video image. Therefore, the coefficient calculation unit 240 according to the second embodiment calculates the false estimation coefficient for each of the image frames. Accordingly, it is possible to change the false estimation coefficient in accordance with the change in the situation. Therefore, according to the second embodiment, it is possible to evaluate the quality of the estimation algorithm more appropriately.

The continuous false estimation computation unit 242 calculates, when a false estimation of the same type has been continuously made for the corresponding object, the false estimation coefficient in such a way that the false estimation coefficient that corresponds to this false estimation type regarding the above object is made high. Specifically, the continuous false estimation computation unit 242 calculates the false estimation coefficient in such a way that, as the number of times of false estimation of the same type continuously made for the corresponding object increases, the false estimation coefficient that corresponds to this false estimation type regarding the above object is made high.

Further specifically, the continuous false estimation computation unit 242 calculates the false estimation coefficient using the following Expression (4) when, for example, false estimation of "overlooking (FN)" has been made for one object. The continuous false estimation computation unit 242 may also calculate the false estimation coefficients that correspond to the other false estimation types, like in Expression (4).

[Expression 4]

if $c==FN$:

$\beta_i(t)=\beta_i(t-1)\times(1+\alpha)$ else $\beta_i(t)=\beta_0$ (4)

The symbol i is an index of the object regarding which an estimation of "overlooking (FN)" has been made in the image frame. Further, in Expression (4), c denotes the false estimation type determined for the object i in the image frame at the timing (t−1). Further, a, which is a weight addition constant, is a constant larger than 0. The symbol a may vary in accordance with the false estimation type to which Expression 4 is applied. For example, the value of a when β is calculated may be made larger than the value of a when α is calculated. Further, $\beta_0$ is an initial value of the false estimation coefficient β. Further, $\beta_i(t)$ is a value of the false estimation coefficient β that corresponds to the object i in the image frame at the timing t.

As shown in Expression (4), when it has been determined that the result of the estimation is "overlooking (FN)" at the previous timing (t−1) and it has been determined that the result of the estimation is "overlooking (FN)" at this timing t as well for the object i, a value obtained by multiplying the previous value of β by (1+a) is the value of β this time. Here, (1+a) is larger than 1. Therefore, the false estimation coefficient β is higher than the previous value. Further, every time it is determined for the object i that the result of the estimation is "overlooking (FN)" continuously, the false estimation coefficient β is multiplied by (1+a). Therefore, as the number of times it is continuously determined that the result of the estimation is "overlooking (FN)" increases, the false estimation coefficient β becomes higher. Note that Expression (4) is one example showing computation in the continuous false estimation computation unit 242. The continuous false estimation computation unit 242 may calculate the false estimation coefficient using another expression which makes the false estimation coefficient higher when the same false estimation has been continuously made for one object.

In the example shown in FIG. 3, it is determined for the object P1 that the result of the estimation is "overlooking (FN)" at the timing of t=5 and it is determined for the object P1 that the result of the estimation is "overlooking (FN)" at the next timing of t=6 as well. Therefore, the false estimation coefficient that corresponds to the object P1 is calculated as $\beta_i(5)=\beta_0$ at t=5 and calculated as $\beta_1(6)=\beta_0 \times (1+a)$ at t=6.

Even when a false estimation has been made for one object just for a moment, if a correct estimation is made at the next timing, it is possible to appropriately detect and track the object. Therefore, the degree of impact is not very large. On the other hand, if false estimation is continuously made, it is possible that detection and tracking of an object may not be appropriately performed during the time. If a period in which the detection and the tracking of the object cannot be appropriately performed becomes longer in traffic control or the like, it is possible that the control of collision avoidance on this object may not be appropriately performed during the period. Therefore, the degree of impact (risk) increases. Therefore, it can be said that the quality of the estimation algorithm that performs such an estimation processing is low. To put it another way, it is desirable for the estimation algorithm not to continuously perform false estimation regarding one object.

On the other hand, the evaluation apparatus 100 according to the second embodiment calculates, when a false estimation of the same type has been continuously made for one object, the false estimation coefficient in such a way that the false estimation coefficient that corresponds to the above false estimation type regarding this object is made high. Accordingly, when the degree of impact has been increased since false estimation has been continuously made, the false estimation coefficient can be made high. Therefore, it is possible to lower the evaluation of the quality of the estimation algorithm that performs the estimation processing for increasing the degree of impact, like in a case in which false estimation is continuously made. To put it another way, it is possible to increase the evaluation of the quality of the estimation algorithm where continuous false estimation is not likely to occur. Therefore, it is possible to evaluate the quality of the estimation algorithm more appropriately.

Further, when a false estimation of "overlooking (FN)" has been continuously made on one object, it is possible that this object may not be detected in the following image frames. In this case, it is possible that this object may not be tracked. In other words, it is possible that this object may be completely overlooked. In this case, it is possible that control of collision avoidance on this object cannot be performed at all. Therefore, the degree of impact becomes extremely large. It can therefore be said that the quality of the estimation algorithm that continuously performs false estimation of "overlooking (FN)" is extremely low. For example, in some estimation algorithms, it is possible that false estimation of "overlooking (FN)" may be continuously made for a pedestrian who is wearing clothes of a particular color.

Meanwhile, the evaluation apparatus 100 according to the second embodiment calculates the false estimation coefficient so as to make the false estimation coefficient $\beta$high when a false estimation of "overlooking (FN)" (the first false estimation) has been continuously made. Accordingly, when the degree of impact has been significantly increased since false estimation of "overlooking (FN)" has been continuously made, the false estimation coefficient $\beta$ can be made high. Therefore, it is possible to lower the evaluation of the quality of the estimation algorithm where false estimation of "overlooking (FN)" is continuously made. Therefore, the evaluation apparatus 100 according to the second embodiment is able to evaluate the quality of the estimation algorithm more appropriately.

The object group computation unit 244 calculates the false estimation coefficient so as to lower the false estimation coefficient that corresponds to the false estimation type regarding one object as the number of other objects whose distances from the above object are equal to or smaller than a predetermined threshold increases. The "other objects" here are those whose type is the same as that of the above object. That is, the object group computation unit 244 makes the false estimation coefficient lower than the initial value when there are many other objects around the object whose type is the same as that of this object. When, for example, one object is a "pedestrian", the false estimation coefficient for this object becomes low when there are many other "pedestrians" around this object.

Specifically, the object group computation unit 244 calculates the false estimation coefficient using the following Expression (5) in a case in which, for example, false estimation of "overlooking (FN)" has been made for one object i. Note that the object group computation unit 244 may calculate false estimation coefficients that correspond to the other false estimation types in a way similar to that in Expression (5).

[Expression 5]

$$\beta_i(t)=\beta_0 \times (1/\sqrt{n+1}) \qquad (5)$$

The symbol n denotes the number of other objects whose type is the same as that of the object i and whose distances from the object i is equal to or smaller than a threshold. From Expression (5), as n becomes larger, the false estimation coefficient $\beta$ becomes lower. Expression (5) is one example showing computation in the object group computation unit 244. The object group computation unit 244 may calculate the false estimation coefficient using another expression that makes the false estimation coefficient lower as the number n of the other objects increases.

As described above, the evaluation apparatus 100 according to the second embodiment calculates the false estimation coefficient so as to make the false estimation coefficient that corresponds to the false estimation type regarding an object lower as the number of other objects whose distances from this object are equal to or smaller than a predetermined threshold is larger. When there are objects whose type is the same as that of one object around the object, these plurality of objects may be treated as an "object group". Therefore, even in a case in which about one in this object group cannot be appropriately detected (e.g., "overlooking"), control and the like of collision avoidance may be performed on this object group, whereby the degree of impact is not very large. It can also be said that the degree of impact when such a false estimation is made is smaller than that in a case in which false estimation is made for an object around which there are no other objects of the same type. That is, it can be said that there is not much need to specifically lower the evaluation of the quality of the estimation algorithm that makes such a false estimation. Therefore, the evaluation apparatus 100 according to the second embodiment is able to evaluate the quality of the estimation algorithm more appropriately.

The speed computation unit 246 calculates the false estimation coefficient in accordance with the speed of the corresponding object. Specifically, the speed computation unit 246 calculates the false estimation coefficient so as to make the false estimation coefficient that corresponds to the false estimation type regarding the object higher as the speed of the object increases. Further specifically, the speed computation unit 246 calculates, for example, the false estimation coefficient using the following Expression (6) for false estimation of "overlooking (FN)". The speed computation unit 246 may calculate false estimation coefficients that correspond to the other false estimation types in a way similar to that in Expression (6).

[Expression 6]

$$\beta_i(t) = \beta_0 + c \times v_i(t) \quad (6)$$

The symbol $v_i(t)$ denotes the speed of the object i at the timing t. The symbol $v_i(t)$ is calculated from the distance by which the object i has moved from the timing (t−1) to the timing t and the time between the image frame at the timing (t−1) and the image frame at the timing t. That is, $v_i(t)$ is calculated from the moving distance of the object i and the frame rate. Further, in Expression (6), c is a constant larger than 0. Note that c may vary in accordance with the false estimation type to which Expression 6 is applied. For example, the value of c in the case in which β is calculated may be different from the value of c in the case in which α is calculated.

From Expression (6), as the speed $v_i(t)$ of the object i increases, the false estimation coefficient β becomes higher. Expression (6) is one example showing the computation in the speed computation unit 246. The speed computation unit 246 may calculate the false estimation coefficient using another expression that makes the false estimation coefficient higher as the speed of the object increases.

If a false estimation is made for an object that moves fast, this object will travel a long distance while this object has not been appropriately detected. Therefore, since it becomes difficult to appropriately control collision avoidance on this object, the degree of impact is large. In particular, as the speed of the object increases, the moving distance while this object has not been appropriately detected increases, which causes the degree of impact to be further increased. If a false estimation of "overlooking (FN)" is made for an object that moves fast, this object will travel a long distance while the estimation algorithm has not detected (overlooked) this object at all. Therefore, the degree of impact of the false estimation of "overlooking (FN)" for an object that moves fast is especially large. To put it another way, it is desirable for the estimation algorithm that a false estimation does not occur for an object that moves fast.

On the other hand, the evaluation apparatus 100 according to the second embodiment calculates the false estimation coefficient in such a way that the false estimation coefficient that corresponds to the false estimation type regarding the object is made higher as the speed of this object increases. Accordingly, when the degree of impact has increased since false estimation has been made for an object that moves fast, the false estimation coefficient can be made high. Therefore, it is possible to lower the evaluation of the quality of the estimation algorithm that performs the estimation processing of increasing the degree of impact, such as making false estimation for an object that moves fast. To put it another way, it is possible to increase the evaluation of the quality of the estimation algorithm where false estimation is not likely to be made for an object that moves fast. Therefore, the evaluation apparatus 100 according to the second embodiment is able to evaluate the quality of the estimation algorithm more appropriately.

The evaluation value calculation unit 260 calculates the evaluation value of the estimation algorithm. In the first embodiment, the false estimation coefficient is constant for each of the false estimation types. On the other hand, in the second embodiment, the false estimation coefficient is calculated for each of the objects (rectangles). That is, even when a false estimation of the same type has been made for a plurality of objects, the false estimation coefficient may vary for each of the objects.

Therefore, in the second embodiment, the evaluation value calculation unit 260 calculates the evaluation value using the evaluation expression shown in the following Expression (7). Like in the first embodiment, the evaluation value calculation unit 260 calculates the evaluation value for each of the image frames (timing t).

[Expression 7]

$$F(t) = 1 - \frac{\sum_{h=1}^{FP(t)} \alpha_h(t) + \sum_{i=1}^{FN(t)} \beta_i(t) + \sum_{j=1}^{IDSWn(t)} \gamma_j(t) + \sum_{k=1}^{IDSWc(t)} \delta_k(t)}{GT(t)} \quad (7)$$

The second term ($\Sigma \beta_i(t)$) of the numerator of the fraction of the second term on the right-hand side of Expression (7) shows that the false estimation coefficient $\beta_i(t)$ regarding the object i regarding which an estimation of "overlooking (FN)" has been made in the image frame at the timing t is added for the number of objects (FN(t)) that correspond to "overlooking (FN)". In other words, the second term of the numerator of the fraction of the second term on the right-hand side of Expression (7) corresponds to a value obtained by adding the false estimation coefficient for the number of objects that correspond to its false estimation type.

In the first term ($\Sigma \alpha_h(t)$) of the numerator of the fraction of the second term on the right-hand side of Expression (7), his an index of the rectangle (object) regarding which a false estimation of "false detection (FP)" has been made. Further, $\alpha_h(t)$ denotes a false estimation coefficient calculated for the rectangle h regarding which a false estimation of "false detection (FP)" has been made in the image frame at the timing t. Therefore, the first term of the numerator of the fraction of the second term on the right-hand side of Expression (7) indicates that the false estimation coefficient $\alpha_h(t)$ regarding the rectangle h regarding which an estimation of "false detection (FP)" has been made in the image frame at the timing t is added for the number of objects (rectangles) (FP(t)) that correspond to "false detection (FP)". In other words, the first term of the numerator of the fraction of the second term on the right-hand side of Expression (7) corresponds to a value obtained by adding the false estimation coefficient for the number of objects (rectangles) that correspond to its false estimation type.

In the third term ($\Sigma \gamma_j(t)$) of the numerator of the fraction of the second term on the right-hand side of Expression (7), j is an index of the rectangle (object) regarding which a false estimation of "new false detection (IDSWn)" has been made. Further, Mt) denotes a false estimation coefficient calculated for the rectangle j regarding which a false estimation of "new false detection (IDSWn)" has been made in the image frame at the timing t. Therefore, the third term of the numerator of the fraction of the second term on the right-hand side of Expression (7) shows that the false estimation coefficient (Mt) regarding the rectangle j regarding which an estimation of "new false detection (IDSWn)" has been made in the image frame at the timing t is added for the number of objects (rectangles) (IDSWn(t)) that correspond to "new false detection (IDSWn)". In other words, the third term of the numerator of the fraction of the second term on the right-hand side of Expression (7) corresponds to a value obtained by adding the false estimation coefficient for the number of objects (rectangles) that correspond to its false estimation type.

In the fourth term ($\Sigma\delta_k(t)$) of the numerator of the fraction of the second term on the right-hand side of Expression (7), k is an index of the object regarding which a false estimation of "switching (IDSWc)" has been made. Further, $\delta_k(t)$ denotes a false estimation coefficient calculated for the object k regarding which a false estimation of "switching (IDSWc)" has been made in the image frame at the timing t. Therefore, the fourth term of the numerator of the fraction of the second term on the right-hand side of Expression (7) indicates that the false estimation coefficient $\delta_k(t)$ regarding the object k regarding which an estimation of "switching (IDSWc)" has been made in the image frame at the timing t is added for the number of objects (IDSWc(t)) that correspond to "switching (IDSWc)". In other words, the fourth term of the numerator of the fraction of the second term on the right-hand side of Expression (7) corresponds to a value obtained by adding the false estimation coefficient for the number of objects that correspond to its false estimation type.

Therefore, the numerator of the fraction of the second term on the right-hand side of Expression (7) corresponds to a total value of values obtained by adding the corresponding false estimation coefficient for the number of objects that correspond to each of the plurality of false estimation types. Then, as shown in Expression (7), as this total value becomes larger, the evaluating value F(t) becomes smaller. That is, as this total value becomes larger, the evaluation of the estimation algorithm becomes lower. Then, when evaluation values have been calculated for all the image frames, the evaluation value calculation unit 260 adds up evaluation values calculated for all the image frames, as shown in the above Expression (3) to calculate the whole evaluation value F, which is the evaluation value for the entire video image of the estimation algorithm.

Figure 7:
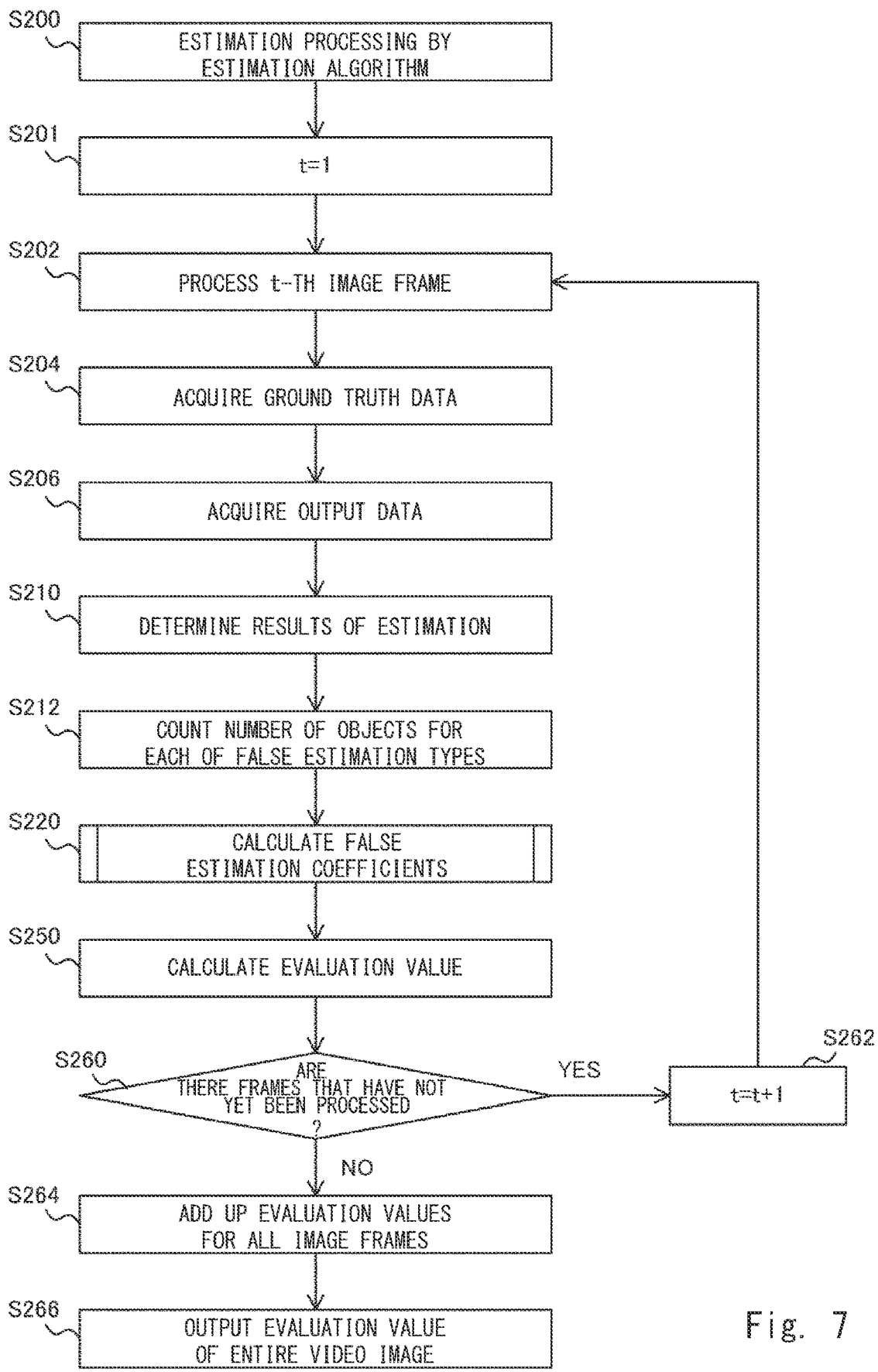
FIG. 7 is a flowchart showing an evaluation method executed by an evaluation system according to the second embodiment.
Figure 8:
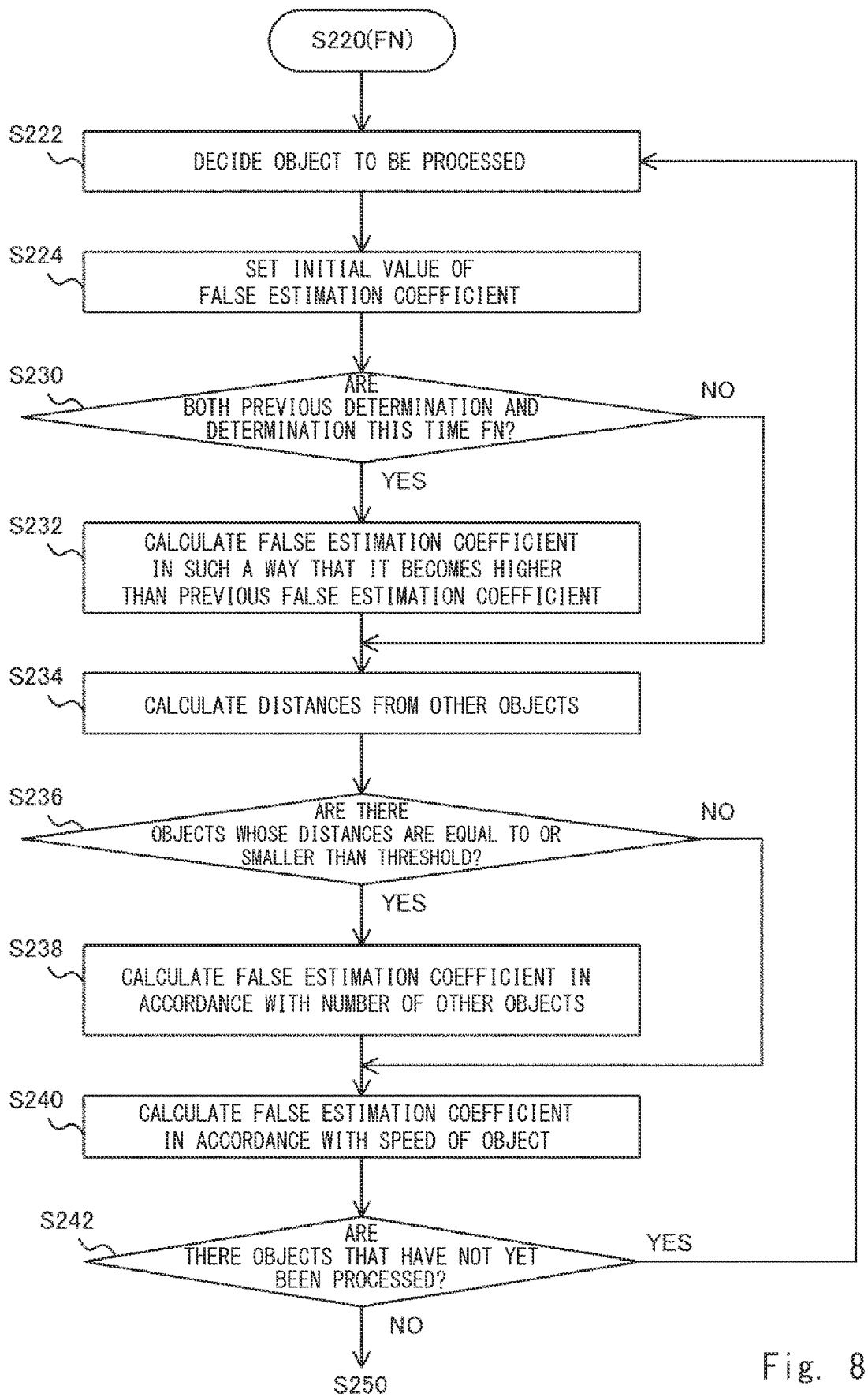
FIG. 8 is a flowchart showing an evaluation method executed by the evaluation system according to the second embodiment.

FIGS. 7 and 8 are flowcharts showing the evaluation method executed by the evaluation system 1 according to the second embodiment. The processing shown in FIGS. 7 and 8 may be mainly executed by the evaluation apparatus 100. First, like in S100 in FIG. 5, the estimation processing by the estimation algorithm is performed by the tracking engine 20 (Step S200). Assuming that t=1 (Step S201), the evaluation apparatus 100 sets the t-th image frame as the target to be processed (Step S202).

The ground truth data acquisition unit 112 acquires the ground truth data regarding the t-th image frame, like in S104 in FIG. 5 (Step S204). The output data acquisition unit 114 acquires output data related to the estimation processing executed for the t-th image frame, like in S106 in FIG. 5 (Step S206). The estimation result determination unit 120 determines the results of the estimation regarding the t-th image frame, like in S110 in FIG. 5 (Step S210). As described above, the estimation result determination unit 120 counts the number of objects for each of the false estimation types, like in S112 in FIG. 5 (Step S212). The coefficient calculation unit 240 calculates the corresponding false estimation coefficient for each of the objects (rectangles) (Step S220). The processing of S220 will be described later with reference to FIG. 8.

After the false estimation coefficient is calculated in S220, the evaluation value calculation unit 160 calculates, for the t-th image frame, the evaluation value of the estimation algorithm using the evaluation expression shown in the above Expression (7) (Step S250). Then the evaluation apparatus 100 determines whether or not there are image frames that have not yet been processed (Step S260). If there are image frames that have not yet been processed (YES in S260), the evaluation apparatus 100 increments t by one (Step S262). Then, the process flow returns to S202, and the evaluation apparatus 100 now processes the next image frame (S202). Then, the processing of S204-S250 is repeated. On the other hand, if there is no image frame that has not yet been processed (NO in S260), the evaluation value calculation unit 160 adds up the evaluation values obtained for all the image frames, as shown in the above Expression (3) (Step S264). Then, the evaluation value output unit 162 outputs the evaluation value of the entire video image (Step S266).

With reference to FIG. 8, the processing of S220 will be described. FIG. 8 shows processing on the object regarding which a false estimation of "overlooking (FN)" has been made. Note that the processing similar to that shown in FIG. 8 may be performed for the other false estimation types. Further, the calculation of the false estimation coefficients regarding a plurality of false estimation types may be executed in parallel with each other.

The coefficient calculation unit 240 decides the object i to be processed from the objects regarding which a false estimation of "overlooking (FN)" has been made in the image frame to be processed (Step S222). The object to be processed may be decided for each ID of the object. The coefficient calculation unit 240 sets the initial value of the false estimation coefficient (Step S224). Specifically, the coefficient calculation unit 240 extracts the initial value ($\beta_0$) of the false estimation coefficient $\beta$ regarding "overlooking (FN)" from the parameter storage unit 130 and sets the extracted initial value.

The continuous false estimation computation unit 242 determines whether or not both the determination of the false estimation in the previous image frame (t–1) and the determination of the false estimation in the image frame this time (t) are "overlooking (FN)" for the object i to be processed (Step S230). When it has been determined as false estimation of "overlooking (FN)" for the object i in the previous image frame as well (YES in S230), the continuous false estimation computation unit 242 calculates the false estimation coefficient $\beta_i(t)$ in such a way that the false estimation coefficient $\beta_i(t)$ becomes higher than the false estimation coefficient $\beta_i(t-1)$ in the previous image frame (Step S232). Specifically, the continuous false estimation computation unit 242 calculates the false estimation coefficient $\beta_i(t)$ using the aforementioned Expression (4). On the other hand, when it is not determined as false estimation of "overlooking (FN)" in the previous image frame (NO in S230), the processing of S232 is skipped. That is, the continuous false estimation computation unit 242 sets $\beta_i(t)$ =$\beta_0$.

The object group computation unit 244 calculates the distances between the object i to be processed and other objects of the same type (Step S234). The distances between objects may be calculated by estimating, for example, the actual positions of the object i to be processed and the other objects from the pixels that correspond to the object i to be processed and the pixels that correspond to the other objects and calculating the distances between the estimated actual positions. Alternatively, the distances between objects may be calculated using, for example, the distances between the pixels that correspond to the object i to be processed and the pixels that correspond to the other objects in the image frame.

The object group computation unit 244 determines whether or not there are other objects whose distances from the object i to be processed are equal to or smaller than a threshold (Step S236). The threshold of the distance is, for example, but not limited to, about 5 m in the actual environment. The threshold may be set as appropriate to the extent that one or more objects whose distances from the object i are within the threshold can be recognized as an object group along with the object i.

If there are other objects whose distances from the object i to be processed are equal to or smaller than the threshold (YES in S236), the object group computation unit 244 calculates the false estimation coefficient in accordance with the number of other objects (Step S238). Specifically, the object group computation unit 244 calculates the false estimation coefficient $\beta_i(t)$ using Expression (5). When the processing of S232 has been performed, the object group computation unit 244 may replace $\beta_0$ in Expression (5) by the value of $\beta_i(t)$ obtained by the processing of S232.

On the other hand, when there are no other objects whose distances from the object i to be processed are equal to or smaller than the threshold (NO in S236), the processing of S238 is skipped. That is, the object group computation unit 244 maintains $\beta_i(t)$ to be the value of the false estimation coefficient calculated by the continuous false estimation computation unit 242.

The speed computation unit 246 calculates the false estimation coefficient in accordance with the speed of the object i to be processed (Step S240). Specifically, the speed computation unit 246 calculates (estimates) the speed of the object i to be processed. The speed computation unit 246 then calculates the false estimation coefficient $\beta_i(t)$ using Expression (6). When at least one of the processing of S232 and S238 has been performed, the speed computation unit 246 may replace $\beta_0$ in Expression (6) by the value of $\beta_i(t)$ obtained by the processing of up to S238.

The coefficient calculation unit 240 determines whether or not there are objects that have not yet been processed in the image frame to be processed (Step S242). In the example shown in FIG. 8, the coefficient calculation unit 240 determines whether or not there are objects corresponding to "overlooking (FN)" that have not yet been processed. When there are objects that have not yet been processed (YES in S242), the process flow returns to S222. Then, the object to be processed is decided from the objects that have not yet been processed (S222), and the processing of S224-S240 is repeated. On the other hand, when there is no object that has not yet been processed (NO in S242), the process flow proceeds to S250.

(Application Examples)

By using the evaluation apparatus 100 according to this embodiment, it is possible to decide a threshold of a degree of matching in a determination on the identity between an observation value and an estimated value in such a way that the degree of impact on false estimation in traffic control or the like becomes small in the estimation algorithm. That is, by deciding a threshold that makes the result of the evaluation made by the evaluation apparatus 100 high, it is possible to obtain an estimation algorithm that makes the evaluation high. If, for example, the threshold is set high, "false detection (FP)" tends to occur. On the other hand, if the threshold is set low, "overlooking (FN)" tends to occur. In view of this fact, the evaluation of the estimation algorithm may be performed using the evaluation apparatus 100 for each of cases in which the threshold in the estimation algorithm is set, for example, to 70%, 80%, and 90%, and a threshold with a large evaluation value may be employed.

Further, it is possible to detect an abnormality of a sensor used to track the object in real time using the evaluation apparatus 100 according to this embodiment. That is, the evaluation apparatus 100 acquires, from an object such as a self-driving car, information on the position of itself and uses this positional information as ground truth data. In parallel with this operation, the estimation algorithm performs estimation and tracking of the position of an object (e.g., a self-driving car) and uses the result of the estimation as output data. The evaluation apparatus 100 then performs the aforementioned processing of evaluating the estimation algorithm using the ground truth data and the output data. Then, it is possible to determine that there is an abnormality in the sensor when the evaluation value at this time is lower than the evaluation value at a normal time by a predetermined threshold or more.

(Modified Example)

The present disclosure is not limited to the aforementioned embodiments and may be changed as appropriate without departing from the spirit of the present disclosure. For example, the order of steps (processing) of the flowcharts described above may be changed as appropriate. Further, one or more of the steps (processing) of the flowcharts described above may be omitted. For example, the processing of S212 in FIG. 7 may be omitted.

Further, in the second embodiment, not all the continuous false estimation computation unit 242, the object group computation unit 244, and the speed computation unit 246 that form the coefficient calculation unit 240 need to perform the processing. That is, in the flowchart shown in FIG. 8, for example, one of the processing of S230-S232, the processing of S234-S238, and the processing of S240 may not be performed.

Further, while the estimation algorithm is used in an environment of traffic control in the aforementioned embodiments, the usage environment of the estimation algorithm is not limited to traffic control. The evaluation apparatus 100 according to the embodiments is applicable to an estimation algorithm for performing any kind of object detection other than traffic control.

The aforementioned program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray (registered trademark) disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An evaluation system configured to evaluate a quality of an algorithm that estimates the positions of movable objects in a video image and tracks the objects, the evaluation system comprising:
a processor configured to:
determine, for each of the objects, a correct estimation result or one of a plurality of false estimation types, which indicate types of false estimation results using ground truth data that corresponds to the video image and output data indicating the result of the estimation made on the video image by the algorithm; and
add false estimation coefficients that correspond to the plurality of respective false estimation types and are provided so as to become higher in accordance with a degree of impact of the false estimation type for a number of objects that correspond to the false estimation type and thus calculate an evaluation value of the algorithm based on a total value of the added values of the false estimation coefficients obtained for each of the plurality of false estimation types, and
wherein the false estimation coefficient that corresponds to a second false estimation, which is one of the plurality of false estimation types and is a false estimation type regarding a situation in which the algorithm estimates the plurality of objects included in the ground truth data between one timing and the next timing in a switched manner, is set to be higher than the false estimation coefficient that corresponds to a third false estimation, which is a false estimation type regarding a situation in which the algorithm estimates that one of the objects included in the ground truth data at one timing is different from the object included in the ground truth data at the next timing.

2. The evaluation system according to claim 1, wherein the false estimation coefficient that corresponds to a first false estimation, which is one of the plurality of false estimation types and is a false estimation type regarding a situation in which the algorithm has failed to estimate the object included in the ground truth data, is set to be higher than the false estimation coefficients that correspond to the other false estimation types.

3. The evaluation system according to claim 1, wherein the processor is configured to calculate the false estimation coefficient for each timing of estimation.

4. The evaluation system according to claim 3, wherein the processor is configured to calculate when a false estimation of the same type has been continuously made for one object, the false estimation coefficient in such a way that the false estimation coefficient that corresponds to this false estimation type regarding this object is made higher.

5. The evaluation system according to claim 4, wherein the processor is configured to calculate, when a first false estimation, which is a false estimation type regarding a situation in which the algorithm has failed to estimate the object included in the ground truth data, has been continuously made, the false estimation coefficient in such a way that the false estimation coefficient that corresponds to the first false estimation is made higher.

6. The evaluation system according to claim 3, wherein the processor is configured to calculate the false estimation coefficient in such a way that the false estimation coefficient that corresponds to a false estimation type regarding the object becomes higher as the speed of this object increases.

7. The evaluation system according to claim 3, wherein the processor is configured to calculate the false estimation coefficient in such a way that the false estimation coefficient that corresponds to a false estimation type regarding an object becomes lower as the number of other objects whose type is the same as that of the object and whose distances from this object are equal to or smaller than a predetermined threshold becomes larger.

8. An evaluation method for evaluating a quality of an algorithm that estimates the positions of movable objects in a video image and tracks the objects, the evaluation method comprising:
determining, for each of the objects, a correct estimation result or one of a plurality of false estimation types, which indicate types of false estimation results, using ground truth data that corresponds to the video image and output data indicating the result of the estimation made on the video image by the algorithm; and
adding false estimation coefficients that correspond to the plurality of respective false estimation types and are provided so as to become higher in accordance with a degree of impact of the false estimation type for a number of objects that correspond to the false estimation type and thus calculating an evaluation value of the algorithm based on a total value of the added values of the false estimation coefficients obtained for each of the plurality of false estimation types, and
wherein the false estimation coefficient that corresponds to a second false estimation, which is one of the plurality of false estimation types and is a false estimation type regarding a situation in which the algorithm estimates the plurality of objects included in the ground truth data between one timing and the next timing in a switched manner, is set to be higher than the false estimation coefficient that corresponds to a third false estimation, which is a false estimation type regarding a situation in which the algorithm estimates that one of the objects included in the ground truth data at one timing is different from the object included in the ground truth data at the next timing.

9. A non-transitory computer readable medium storing a program for implementing an evaluation method for evaluating a quality of an algorithm that estimates the positions of movable objects in a video image and tracks the objects, the program causing a computer to execute the processing of:
determining, for each of the objects, a correct estimation result or one of a plurality of false estimation types, which indicate types of false estimation results, using ground truth data that corresponds to the video image and output data indicating the result of the estimation made on the video image by the algorithm; and
adding false estimation coefficients that correspond to the plurality of respective false estimation types and are provided so as to become higher in accordance with a degree of impact of the false estimation type for a number of objects that correspond to the false estimation type and thus calculating an evaluation value of the algorithm based on a total value of the added values of the false estimation coefficients obtained for each of the plurality of false estimation types, and
wherein the false estimation coefficient that corresponds to a second false estimation, which is one of the plurality of false estimation types and is a false estimation type regarding a situation in which the algorithm estimates the plurality of objects included in the ground truth data between one timing and the next timing in a switched manner, is set to be higher than the false estimation coefficient that corresponds to a third false estimation, which is a false estimation type regarding a situation in which the algorithm estimates that one of the objects included in the ground truth data at one timing is different from the object included in the ground truth data at the next timing.

* * * * *